United States Patent
Tatsushiro et al.

(10) Patent No.: US 10,239,536 B2
(45) Date of Patent: Mar. 26, 2019

(54) VEHICLE CONTROL DEVICE

(71) Applicant: TOYOTA JIDOSHA KABUSHIKI KAISHA, Toyota-shi, Aichi (JP)

(72) Inventors: Hiromasa Tatsushiro, Toyota (JP); Kenta Kumazaki, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/814,813

(22) Filed: Nov. 16, 2017

(65) Prior Publication Data

US 2018/0148063 A1    May 31, 2018

(30) Foreign Application Priority Data

Nov. 25, 2016    (JP) .................................. 2016-229578

(51) Int. Cl.
 *B60W 10/06* (2006.01)
 *B60W 10/08* (2006.01)
 (Continued)

(52) U.S. Cl.
 CPC .............. *B60W 30/19* (2013.01); *B60K 6/365* (2013.01); *B60K 6/445* (2013.01); *B60W 10/06* (2013.01);
 (Continued)

(58) Field of Classification Search
 CPC ...... B60W 10/06; B60W 10/08; B60W 10/10; B60W 20/12; B60W 20/40;
 (Continued)

(56) References Cited

U.S. PATENT DOCUMENTS

| 5,637,987 A * | 6/1997 | Fattic ..................... B60K 6/365 |
| | | 322/40 |
| 2003/0176257 A1* | 9/2003 | Matsumura ............ B60K 6/547 |
| | | 477/115 |

(Continued)

FOREIGN PATENT DOCUMENTS

| JP | 2005-076673 A | 3/2005 |
| JP | 2008-019907 A | 1/2008 |

(Continued)

*Primary Examiner* — Edwin A Young
(74) *Attorney, Agent, or Firm* — Oliff PLC

(57) ABSTRACT

A vehicle control device for a vehicle including an engine used as a power source and an automatic transmission, the vehicle control device performing a first running mode in which a shift control of the automatic transmission and a drive force control are provided according to a driver's acceleration/deceleration operation and a second running mode in which the shift control and the drive force control are provided without the acceleration/deceleration operation while a target running state is set, comprising: a slope-road running control portion configured to control the automatic transmission such that an engine rotation speed is kept high during slope-road running on at least one of an uphill road and a downhill road as compared to flat-road running, the slope-road running control portion limiting an increase amount of the engine rotation speed in the second running mode as compared to the first running mode.

20 Claims, 10 Drawing Sheets

(51) Int. Cl.
  *B60W 10/10*   (2012.01)
  *B60W 30/19*   (2012.01)
  *B60W 10/115*  (2012.01)
  *B60W 20/40*   (2016.01)
  *B60K 6/365*   (2007.10)
  *B60K 6/445*   (2007.10)
  *B60W 30/18*   (2012.01)
  *B60W 30/182*  (2012.01)
  *B60W 20/12*   (2016.01)
  *F16H 61/662*  (2006.01)

(52) U.S. Cl.
  CPC ............ *B60W 10/08* (2013.01); *B60W 10/10* (2013.01); *B60W 10/115* (2013.01); *B60W 20/12* (2016.01); *B60W 20/40* (2013.01); *B60W 30/182* (2013.01); *B60W 30/18009* (2013.01); *B60W 2540/10* (2013.01); *B60W 2550/142* (2013.01); *B60W 2710/0644* (2013.01); *F16H 61/66272* (2013.01); *F16H 2200/2025* (2013.01); *Y02T 10/6221* (2013.01); *Y02T 10/6239* (2013.01); *Y02T 10/76* (2013.01)

(58) Field of Classification Search
  CPC ............ B60W 30/1882; B60W 30/19; B60W 2550/142; B60W 2710/0644
  See application file for complete search history.

(56) References Cited

U.S. PATENT DOCUMENTS

| | | | |
|---|---|---|---|
| 2007/0112496 A1* | 5/2007 | Ji | B60K 6/445 701/70 |
| 2009/0240405 A1 | 9/2009 | Tawara | |
| 2011/0212804 A1* | 9/2011 | Imamura | B60K 6/445 475/150 |

FOREIGN PATENT DOCUMENTS

| | | |
|---|---|---|
| JP | 2010-090980 A | 4/2010 |
| JP | 2016-175502 A | 10/2016 |
| JP | 2016-182887 A | 10/2016 |
| JP | 2016-183727 A | 10/2016 |
| JP | 2016-183728 A | 10/2016 |

* cited by examiner

|     | C1 | C2 | B1 | B2 | B3 |
|-----|----|----|----|----|----|
| 1st | ○  |    |    |    | ○  |
| 2nd | ○  |    |    | ○  |    |
| 3rd | ○  |    | ○  |    |    |
| 4th | ○  | ○  |    |    |    |
| R   |    | ○  |    |    | ○  |
| N   |    |    |    |    |    |

(○ ENGAGED)

|      | C1 | C2 | C3 | C4 | B1 | B2 |
|------|----|----|----|----|----|----|
| 1st  | O  |    |    |    |    | O  |
| 2nd  | O  |    |    |    | O  |    |
| 3rd  | O  |    | O  |    |    |    |
| 4th  | O  |    |    | O  |    |    |
| 5th  | O  | O  |    |    |    |    |
| 6th  |    | O  |    | O  |    |    |
| 7th  |    | O  | O  |    |    |    |
| 8th  |    | O  |    |    | O  |    |
| Rev1 |    |    | O  |    |    | O  |
| Rev2 |    |    |    | O  |    | O  |
| N    |    |    |    |    |    |    |

(O : ENGAGED)

VEHICLE CONTROL DEVICE

INCORPORATION BY REFERENCE

The disclosure of Japanese Patent Application No. 2016-229578 filed on Nov. 25, 2016 including the specification, drawings and abstract is incorporated herein by reference in its entirety.

TECHNICAL FIELD

The present invention relates to an improvement of a vehicle control device having a running mode in which a drive force control and a shift control are provided without a driver's acceleration/deceleration operation.

BACKGROUND ART

A technique in a vehicle having an engine used as a power source and an automatic transmission has been proposed for controlling the automatic transmission to keep an engine rotation speed high during running on a slope road as compared to running on a flat road. A device described in Patent Document 1 is an example thereof and, during running on an uphill road, the engine rotation speed is maintained at predetermined high rotation by limiting an upshift or performing a downshift in the automatic transmission regardless of a return operation of an accelerator pedal, so as to improve a reacceleration performance. Patent Document 2 describes a technique of improving an acceleration feeling by making the engine rotation speed higher than usual at the time of power-on running (running with an accelerator pedal being pressed) on an uphill road.

PRIOR ART DOCUMENTS

Patent Documents

Patent Document 1: Japanese Laid-Open Patent Publication No. 2005-76673
Patent Document 2: Japanese Laid-Open Patent Publication No. 2010-90980
Patent Document 3: Japanese Laid-Open Patent Publication No. 2008-19907

SUMMARY OF THE INVENTION

Problem to be Solved by the Invention

In recent years, a running mode is proposed for setting a target running state to provide a drive force control and a shift control without a driver's acceleration/deceleration operation as in a cruise control (constant speed running control) described in Patent Document 3, for example, and it is conceivable also in such a running mode that the engine rotation speed is kept high on an uphill road so as to ensure drivability (drive force responsiveness). However, since the driver does not perform the acceleration/deceleration operation, the driver's demand for drivability has relatively low priority, so that the driver is less likely to feel strange even if the drivability is somewhat poor, and it is important to balance with the drivability and deterioration in fuel consumption due to setting the engine rotation speed higher. The same problem may occur also when the control is provided to keep the engine rotation speed high by a downshift so as to acquire an engine braking force on a downhill road.

The present invention was conceived in view of the situations and it is therefore an object of the present invention to coordinate drivability and fuel consumption efficiency on a slope road in a vehicle control device having a running mode in which a drive force control is provided without an acceleration/deceleration operation.

Solution to Problem

To achieve the above object, a first aspect of the invention provides a vehicle control device (a) for a vehicle including an engine used as a power source and an automatic transmission, (b) the vehicle control device pedal ling a first running mode in which a shift control of the automatic transmission and a drive force control are provided according to a driver's acceleration/deceleration operation and a second running mode in which the shift control and the drive force control are provided without the acceleration/deceleration operation while a target running state is set, comprising: (c) a slope-road running control portion controlling the automatic transmission such that an engine rotation speed is kept high during slope-road running on at least one of an uphill road and a downhill road as compared to flat-road running, (d) the slope-road running control portion limiting an increase amount of the engine rotation speed in the second running mode as compared to the first running mode.

The limitation of the increase amount of the engine rotation speed in the second running mode includes the case of setting the increase amount of the engine rotation speed to zero or stopping the engine rotation. Therefore, the control of increasing the engine rotation speed during slope-road running by the slope-road running control portion may be cancelled in the second running mode.

A second aspect of the invention provides a vehicle control device (a) for a vehicle including an engine used as a power source and an automatic transmission, (b) the vehicle being a hybrid vehicle further including an electric motor as the power source, the vehicle control device performing a motor running mode performed by using the electric motor while the engine is stopped and an engine running mode performed by using the power of the engine, (c) the vehicle control device performing a first running mode in which a shift control of the automatic transmission and a drive force control are provided according to a driver's acceleration/deceleration operation and a second running mode in which the shift control and the drive force control are provided without the acceleration/deceleration operation while a target running state is set, comprising: (d) a slope-road running control portion controlling the automatic transmission such that an engine rotation speed is kept high during slope-road running on at least one of an uphill road and a downhill road as compared to flat-road running, (e) the slope-road running control portion limiting an increase amount of the engine rotation speed in the second running mode as compared to the first running mode.

A third aspect of the invention provides the vehicle control device according to the second aspect of the invention, wherein the slope-road running control portion operates the engine and controls the automatic transmission such that the engine rotation speed is kept high during the slope-road running as compared to the flat-road running in the first running mode, and stops the engine in the second running mode.

A fourth aspect of the invention provides a vehicle control device (a) for a hybrid vehicle including an engine, an electric generator rotationally driven by the engine, and an electric motor for running generating power from electric energy generated by the electric generator, (b) the vehicle control device performing a first running mode in which a drive force control is provided according to a driver's acceleration/deceleration operation and a second running mode in which the drive force control is provided without the acceleration/deceleration operation while a target running state is set, comprising: (c) a slope-road running control portion keeping an engine rotation speed high during slope-road running on at least one of an uphill road and a downhill road as compared to flat-road running, (d) the slope-road running control portion limiting an increase amount of the engine rotation speed in the second running mode as compared to the first running mode.

A fifth aspect of the invention provides the vehicle control device according to the fourth aspect of the invention, wherein the hybrid vehicle is a series-hybrid vehicle in which the engine is used exclusively for electric generation.

A sixth aspect of the invention provides the vehicle control device according to the fourth or fifth aspect of the invention, wherein the slope-road running control portion keeps the engine rotation speed high during climbing the uphill road as compared to flat-road running and makes an electric power generated by the electric generator smaller during climbing the uphill road in the second running mode as compared to climbing the uphill road in the first running mode.

A seventh aspect of the invention provides the vehicle control device according to any one of the fourth to sixth aspects of the invention, wherein the slope-road running control portion operates the engine and keeps the engine rotation speed high during the slope-road running as compared to the flat-road running in the first running mode, and stops the engine in the second running mode.

An eighth aspect of the invention provides the vehicle control device according to any one of the first to seventh aspects of the invention, wherein the second running mode includes a follow-up running mode in which a target drive force is calculated to enable follow-up running for a preceding vehicle and the target drive force is used as the target running state.

A ninth aspect of the invention provides the vehicle control device according to any one of the first to seventh aspects of the invention, wherein the second running mode includes an automatic driving running mode in which the target running state is set based on road information for automatically performing acceleration/deceleration.

A tenth aspect of the invention provides the vehicle control device according to any one of the first to seventh aspects of the invention, wherein (a) the second running mode includes a plurality of running modes different in degree of driver's demand for the acceleration/deceleration, and wherein (b) the slope-road running control portion makes the increase amount of the engine rotation speed smaller in the second running mode in which the degree of demand for the acceleration/deceleration is small, as compared to the second running mode in which the degree of demand for the acceleration/deceleration is large.

The control of making the increase amount of the engine rotation speed smaller in the second running mode associated with the small degree of demand for acceleration/deceleration includes the case of setting the increase amount of the engine rotation speed to zero or stopping the engine rotation. Therefore, the control of increasing the engine rotation speed during slope-road running by the slope-road running control portion may be cancelled in the second running mode associated with the small degree of demand for acceleration/deceleration.

An eleventh aspect of the invention provides the vehicle control device according to any one of the first to seventh aspects of the invention, wherein (a) the second running mode includes a follow-up running mode in which a target drive force is calculated to enable follow-up running for a preceding vehicle and the target drive force is used as the target running state, and an automatic driving running mode in which the target running state is set based on road information for automatically performing acceleration/deceleration, and wherein (b) the slope-road running control portion makes the increase amount of the engine rotation speed smaller in the automatic driving running mode as compared to the follow-up running mode.

Since the acceleration/deceleration control is provided depending on acceleration/deceleration of the preceding vehicle, the follow-up running mode is considered to have a larger degree of demand for acceleration/deceleration as compared to the automatic driving running mode and can be regarded as the second running mode in which the degree of demand for acceleration/deceleration is large in the tenth aspect of invention, and the automatic driving running mode can be regarded as the second running mode in which the degree of demand for acceleration/deceleration is small in the tenth aspect of invention.

A twelfth aspect of the invention provides the vehicle control device according to any one of the first to seventh aspects of the invention, wherein (a) the second running mode includes an automatic steering running mode in which a steering angle is automatically controlled based on road information and a manual steering running mode in which the steering angle is operated by a driver, and wherein (b) the slope-road running control portion makes the increase amount of the engine rotation speed smaller in the automatic steering running mode as compared to the manual steering running mode.

Advantageous Effects of the Invention

The vehicle control device according to the first, second, and fourth aspects of the invention includes the slope-road running control portion keeping the engine rotation speed high during slope-road running as compared to flat-road running and excellent drivability is acquired during slope-road running, while the increase amount of the engine rotation speed is limited in the second running mode as compared to the first running mode, so that the fuel consumption efficiency is improved. In the second running mode, since the driver does not perform the acceleration/deceleration operation, the driver's demand for acceleration/deceleration is limited, so that the driver is less likely to feel strange even if the drivability is somewhat poor due to the limitation of the increase amount of the engine rotation speed. Particularly, if the second running mode includes the automatic driving running mode in which the target running state is set based on road information for automatically performing acceleration/deceleration as in the ninth aspect of invention, it is considered that prioritizing smooth ride quality and fuel consumption efficiency over drivability matches the occupant's intention.

In the tenth aspect of the invention, the increase amount of the engine rotation speed is made smaller during the second running mode in which the degree of demand for acceleration/deceleration is small, as compared to the second running mode in which the degree of demand for acceleration/deceleration is large and, therefore, the fuel consumption efficiency can further be improved by making the increase amount of the engine rotation speed smaller during the second running mode in which the degree of demand for acceleration/deceleration is small while ensuring the drivability during the second running mode in which the degree of demand for acceleration/deceleration is large. Specifically, when a degree of driver's demand (expectation) for acceleration/deceleration is larger, the driver's demand for drivability is considered to be higher and, therefore, the increase amount of the engine rotation speed is made larger than when the degree of demand for acceleration/deceleration is small, so as to ensure the drivability during slope-road running.

In the eleventh aspect of the invention, the follow-up running mode and the automatic driving running mode are included as the second running mode, and the increase amount of the engine rotation speed is made smaller during the automatic driving running mode as compared to the follow-up running mode and, therefore, the fuel consumption efficiency can further be improved by making the increase amount of the engine rotation speed smaller during the automatic driving running mode while ensuring the drivability during the follow-up running mode. In particular, since the vehicle follows the preceding vehicle in the follow-up running mode, it is considered that the degree of driver's demand for acceleration/deceleration is higher as compared to the automatic driving running mode, so that the increase amount of the engine rotation speed is made larger as compared to the automatic driving running mode to ensure the drivability during slope-road running.

In the twelfth aspect of the invention, the automatic steering running mode and the manual steering running mode are included as the second running mode, and the increase amount of the engine rotation speed is made smaller during the automatic steering running mode as compared to the manual steering running mode and, therefore, the fuel consumption efficiency can further be improved by making the increase amount of the engine rotation speed smaller during the automatic steering running mode while ensuring the drivability during the manual steering running mode. In particular, a degree of participation of driver's driving operation is larger in the manual steering running mode since the driver controls the steering angle, and it is considered that the degree of driver's demand for drivability is higher as compared to the automatic steering running mode. Thus, the increase amount of the engine rotation speed is made larger as compared to the automatic steering running mode to ensure the drivability during slope-road running.

MODES FOR CARRYING OUT THE INVENTION

Figure 14:
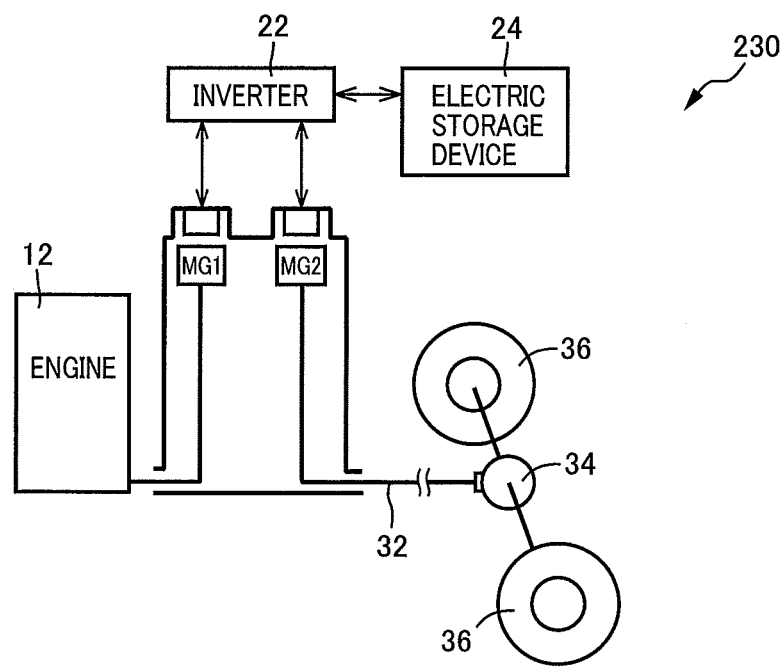
FIG. 14 is a schematic for explaining still another vehicle drive device for a hybrid vehicle to which the present invention is preferably applied.

The present invention is preferably applied to a hybrid vehicle having an engine and an electric motor as a power source and may also be applied to an engine drive vehicle having only an engine as the power source. The present invention is also applied to a series-hybrid vehicle (see a hybrid vehicle 230 shown in FIG. 14, for example) including an engine exclusively used for electric generation and an electric generator as well as an electric motor for running and, if an engine rotation speed is increased for electric generation during climbing a slope, i.e., if an electric power generated by the electric generator is increased, the increase amount thereof may be changed depending on a running mode. The engine is an internal combustion engine such as a gasoline engine or a diesel engine combusting fuel to generate power, and a motor generator also usable as an electric generator is preferably used as the electric motor.

A transmission used as an automatic transmission is a multi-speed automatic transmission of a planetary gear type, a parallel shaft type, etc. having a plurality of gear positions established according to an engagement/release state of a plurality of friction engagement devices, or a continuously variable transmission of a belt type etc. The present invention is also applicable to a vehicle including an electric continuously variable transmission comprising a differential mechanism such as a planetary gear device with an input element thereof coupled to an engine, a reaction force element thereof coupled to an electric generator, and an output element thereof coupled to drive wheels such that the rotation speed of the engine is continuously variably changed by a rotation speed control of the electric generator and is transmitted to the output element. For example, if the engine is started (i.e. is put in an operated state) during climbing a slope without an acceleration demand to promptly generate a drive force through the torque control of the electric generator at the time of reacceleration (acceleration thereafter), the engine rotation speed can be made lower as compared to the first running mode, or the rotation may be stopped, in the second running mode. The engine may not necessarily rotate by itself and may simply be dragged and rotated by the electric generator due to the torque control etc. In this case, the rotation may be less than an idle rotation speed.

A target running state in the second running mode includes, for example, a target vehicle speed, a target inter-vehicle distance, a target acceleration, a target drive force, a target braking force, a target steering angle, etc. Specifically, the second running mode may be a constant speed running mode in which the target drive force is calculated such that a vehicle runs at a target vehicle speed set by a driver for performing constant speed running in which the vehicle runs at a substantially constant vehicle speed, a follow-up running mode in which the target drive force is calculated based on an inter-vehicle distance to a preceding vehicle to perform follow-up running in which the vehicle runs at a predetermined target inter-vehicle distance, or an automatic driving running mode in which the target vehicle speed is sequentially set based on road information etc. of a running route to calculate the target drive force and automatically control a steering angle for running and, any one of the second running modes may be available when the present invention is implemented. If the steering angle is controlled by a driver in the constant speed running mode and the follow-up running mode, this can be regarded as a manual steering running mode. If the steering angle is automatically controlled for running in the automatic driving running mode, this can be regarded as an automatic steering running mode. A drive force control may be provided based on target torque and the target acceleration.

The automatic driving running mode may be a running mode in which the target vehicle speed is sequentially automatically set based on map information and running route information, the target drive force is calculated depending on the target vehicle speed, and the steering angle is automatically controlled for running according to the running route. Otherwise, the automatic driving running mode may be a running mode in which surrounding road conditions etc. may be recognized with a camera etc. for parking in a garage, parallel parking, etc. without driver's operation. Alternatively, the automatic driving running mode may be a running mode in which a vehicle is automatically called simply from a parking area etc. along a predetermined running route to a predetermined position such as an entrance of a house, and various forms are available. This automatic driving running mode can be implemented not only as a manned automatic driving running mode in which an occupant such as a driver is on board but also as an unmanned automatic driving running mode without an occupant including a driver. In this description, the automatic driving running mode refers to the case that the target running state is set based on at least road information to automatically perform acceleration/deceleration, and the automatic control of the steering angle is not a requirement. The road information includes information on road gradients, curves, etc. and can be acquired from map information or can be captured through road-to-vehicle communication etc. Alternatively, the road information can be obtained from a picture or video of traffic lanes etc. using a camera.

A slope-road running control portion controls the automatic transmission to keep the engine rotation speed high during slope-road running on at least one of uphill and downhill roads as compared to flat-road running and may provide the control of increasing the engine rotation speed on only one of the uphill and downhill roads or may provide the control of increasing the engine rotation speed on both the uphill, and downhill roads. In addition to limiting the upshift of the automatic transmission, a downshift may be performed to actively raise the engine rotation speed.

Regarding (a) a vehicle having an electric differential portion that continuously variably changes the rotation speed of an engine through a torque control of a rotating machine for differential action to an intermediate transmitting member and (b) an automatic transmission disposed between the intermediate transmitting member and drive wheels and capable of mechanically establishing a plurality of gear positions different in transmission ratio of the rotation speed of the intermediate transmitting member to an output rotation speed of the automatic transmission, (c) in the case of a vehicle control device having a multi-speed simulation control portion controlling the electric differential portion so as to establish a plurality of simulated gear positions different in transmission ratio of the engine rotation speed to the output rotation speed of the automatic transmission, (d) it is desirable to limit multi-speed simulation in the second running mode as compared to the first running mode so as to suppress deterioration in fuel consumption efficiency due to the multi-speed simulation. Specifically, a control region is narrowed in which the engine is allowed to operate at the time of the multi-speed simulation so as to approximate to an optimum fuel consumption efficiency line, or the multi-speed simulation may be cancelled in the second running mode.

EXAMPLES

Examples of the present invention will now be described in detail with reference to the drawings.

Figure 1:
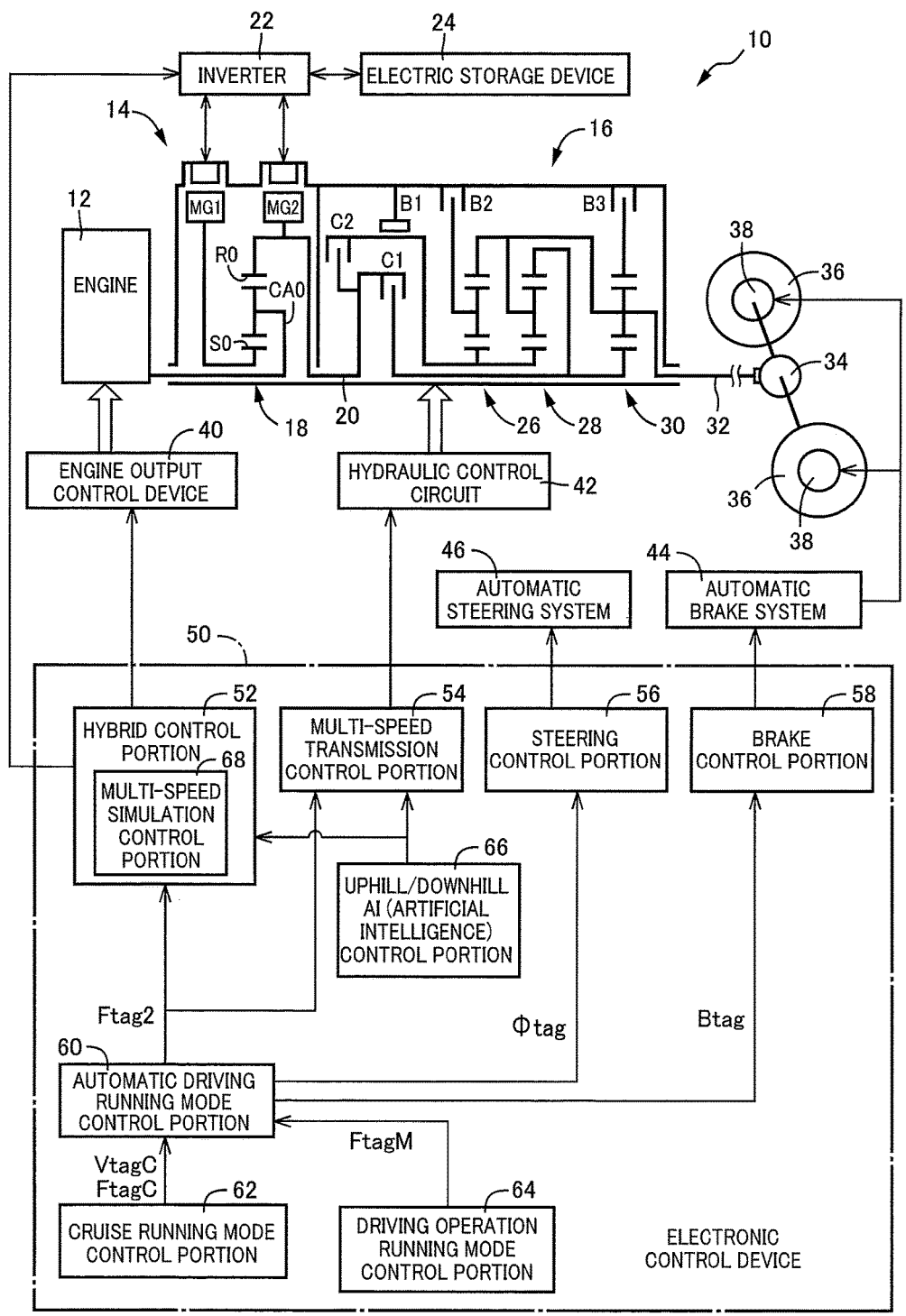
FIG. 1 is a schematic for explaining a vehicle drive device for a hybrid vehicle to which the present invention is applied, also showing a main portion of a control system.

FIG. 1 is a schematic of a vehicle drive device 10 for a hybrid vehicle to which the present invention is applied, also showing a main portion of a control system. This vehicle drive device 10 includes an engine 12, an electric differential portion 14, and an automatic transmission 16 in series. The engine 12 is an internal combustion engine such as a gasoline engine or a diesel engine and has output controlled by an engine output control device 40. The engine output control device 40 includes an electronic throttle valve 100, a fuel injection device 102, an ignition device 104, etc. shown in FIG. 4, for example, and the electronic throttle valve 100, the fuel injection device 102, the ignition device 104, etc. are each controlled according to a control signal supplied from an electronic control device 50 so as to electrically control the engine output. The electric differential portion 14 includes a single pinion type planetary gear device 18 as a differential gear mechanism. The planetary gear device 18 includes a carrier CA0 coupled to the engine 12, a sun gear S0 coupled to a first motor generator MG1, and a ring gear R0 coupled to an intermediate transmitting member 20 such that the gears can rotate with differential motion each other, and the intermediate transmitting member 20 is coupled to a second motor generator MG2. Since the electric differential portion 14 and the automatic transmission 16 are configured substantially symmetrically across the axis thereof, the lower halves are not shown in the schematic of FIG. 1.

Figures 2, 3:
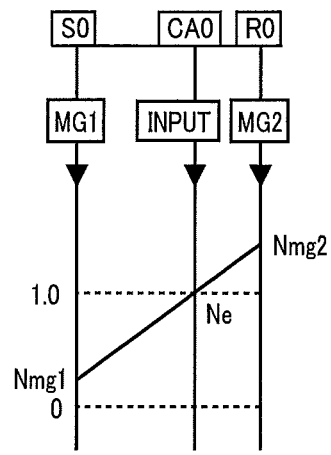
FIG. 2 is a collinear chart for explaining a relative rotation speed of each rotating element of an electric differential portion of FIG. 1.
FIG. 3 is an engagement operation table for explaining a plurality of gear positions of an automatic transmission of FIG. 1 and friction engagement devices for establishing the gear positions.

FIG. 2 is a collinear chart in which the rotation speeds of the three rotating elements S0, CA0, R0 of the electric differential portion 14 can be expressed by a straight line; a rotation speed Nmg1 of the sun gear S0 is a rotation speed of the first motor generator MG1 (MG1 rotation speed), a rotation speed Ne of the carrier CA0 is a rotation speed of the engine 12 (engine rotation speed); a rotation speed Nmg2 of the ring gear R0 is a rotation speed of the second motor generator MG2 (MG2 rotation speed); and a regenerative torque control and a power running torque control of the first motor generator MG1 and the second motor generator MG2 are used for continuously variably changing the MG2 rotation speed Nmg2 that is a differential output rotation speed with respect to the engine rotation speed Ne that is a differential input rotation speed. Therefore, the electric differential portion 14 functions as an electric continuously variable transmission capable of continuously variably changing a transmission ratio $\gamma 0$ (=Ne/Nmg2), and the first motor generator MG 1 functions as a differential rotating machine. The carrier CA0 coupled to the engine 12 is an input element, the sun gear S0 coupled to the first motor generator MG1 is a reaction element, and the ring gear R0 coupled to the intermediate transmitting member 20 is an output element. The first motor generator MG1 and the second motor generator MG2 are connected to a rechargeable/dischargeable electric storage device 24 via an inverter 22 and each have motor torque electrically controlled according to a motor control signal supplied from the electronic control device 50. Both of these motor generators MG1 and MG2 have functions of an electric motor and an electric generator, and the first motor generator MG1 is mainly used as an electric generator to generate a reaction force, while the second motor generator MG2 is mainly used as an electric motor to output a drive force. The engine 12, the electric differential portion 14, and the second motor generator MG2 function as a power source of the vehicle drive device 10. In this example, the engine 12, the first motor generator MG1, and the second motor generator MG2 are directly coupled to the carrier CA0, the sun gear S0, and the ring gear R0, respectively; however, a speed change gear, a clutch, etc. may be interposed therebetween.

The automatic transmission 16 is a planetary gear type multi-speed transmission, and changes a speed of rotation of the intermediate transmitting member 20 and outputs from an output shaft 32. Specifically, the automatic transmission 16 includes a single pinion type first planetary gear device 26, a single pinion type second planetary gear device 28, and a single pinion type third planetary gear device 30, and also has two clutches C1, C2 and three brakes B1, B2, B3 (hereinafter simply referred to as clutches C and brakes B if not particularly distinguished) provided as hydraulic friction engagement devices. As shown in an engagement operation table of FIG. 3, any two of the clutches C and the brakes B are engaged to establish four forward gear positions 1st to 4th and a backward gear position R (reverse) different in transmission ratio $\gamma 1$ (=Nmg2/Nout) that is a ratio between the rotation speed Nmg2 of the intermediate transmitting member 20 and a rotation speed (output rotation speed) Nout of the output shaft 32, and all of these are released to establish N (neutral) at which power transmission is interrupted. The clutches C and the brakes B are engaged by supplying a hydraulic pressure from a hydraulic control circuit 42, and AT solenoid valves 106 (see FIG. 4) etc. of the hydraulic control circuit 42 are electrically controlled according to a shift control signal supplied from the electronic control device 50 so as to provide engagement/release control. The AT solenoid valves 106 are correspondingly disposed to the clutches C and the brakes B, for example. The output shaft 32 is coupled via a final reduction gear 34 to left and right drive wheels 36.

In the vehicle drive device 10 as described above, the electric differential portion 14 and the automatic transmission 16 can provide the continuously variable transmission control as a whole. Alternatively, by controlling the MG1 rotation speed Nmg1 etc. such that the transmission ratio of the electric differential portion 14 becomes constant, the shift control similar to multi-speed transmission can be provided as a whole. In any case, when the automatic transmission 16 is shifted, the rotation speeds of the portions of the electric differential portion 14, for example, the MG 1 rotation speed Nmg1 etc. are controlled correspondingly to a change in the rotation speed of the intermediate transmitting member 20 associated with the shift so as to promptly and smoothly perform the shift.

The vehicle drive device 10 of this example also includes an automatic brake system 44 and an automatic steering system 46. The automatic brake system 44 electrically controls a braking force, i.e., a braking hydraulic pressure, of each of wheel brakes 38 disposed on the drive wheels 36 and driven wheels (non-driving wheel) not shown according to a brake control signal supplied from the electronic control device 50. The wheel brake 38 is supplied with the braking hydraulic pressure through a brake master cylinder also when a brake pedal not shown is subjected to a stepping operation, so that the braking force corresponding to the braking hydraulic pressure, i.e., a brake operation force Brk, is mechanically generated. The automatic steering system 46 electrically controls a steering angle $\Phi$ by an electric motor etc. according to a steering angle control signal supplied from the electronic control device 50. The steering angle $\Phi$ may be a rotation angle of a steering wheel or a turned angle of a wheel.

The electronic control device 50 functions as a controller providing various controls of the vehicle drive device 10 of this example, such as the output control of the engine 12, the motor torque control of the motor generators MG1, MG2, the shift control of the automatic transmission 16, the braking force control by the automatic brake system 44, and the steering control by the automatic steering system 46, is configured to include a microcomputer having a CPU, a ROM, a RAM, an input/output interface, etc., and executes a signal process according to a program stored in advance in the ROM while utilizing a temporary storage function of the RAM. The electronic control device 50 can also be configured separately for the engine control, the motor control, the shift control, etc., as needed.

Figure 4:
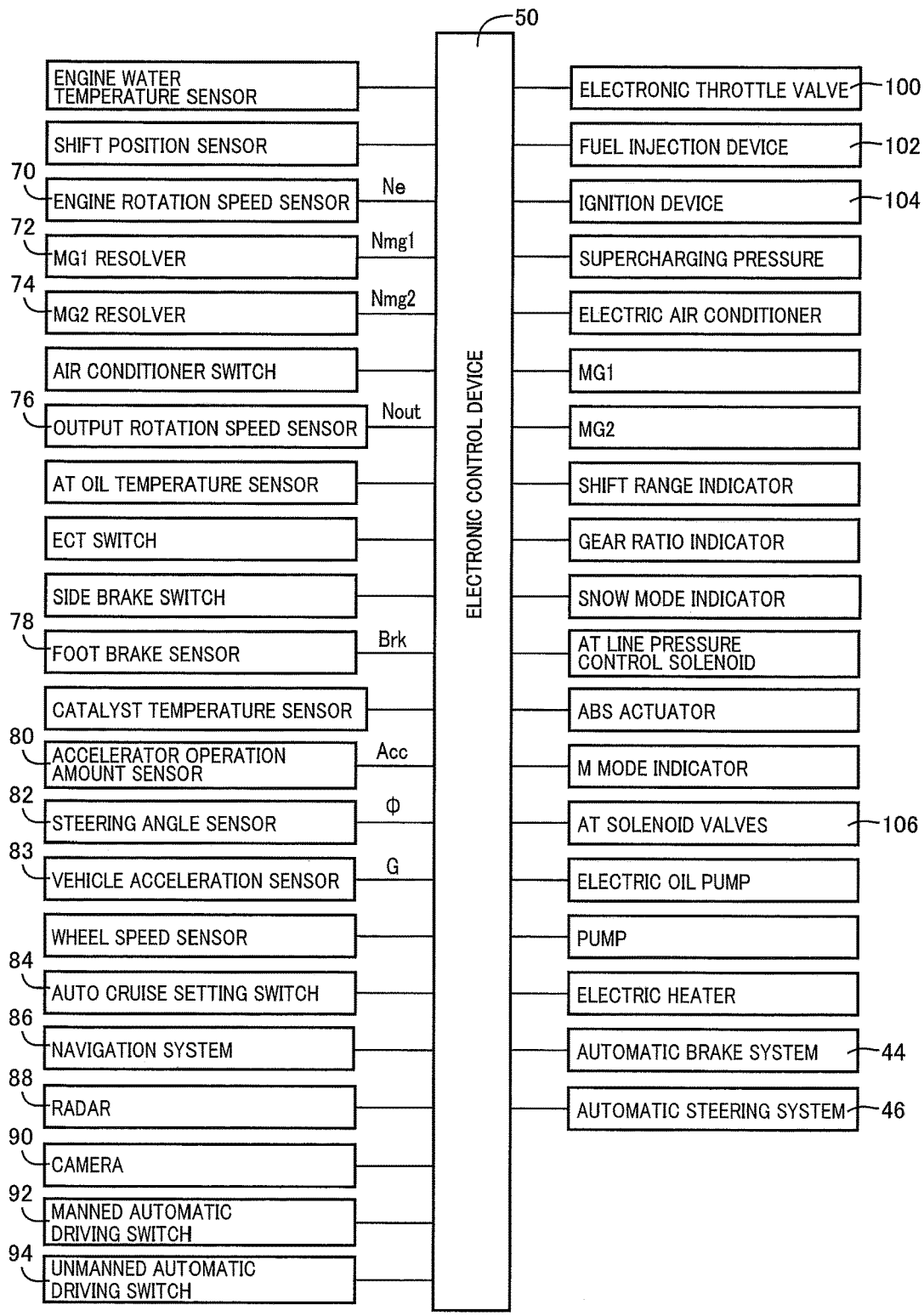
FIG. 4 is a diagram for explaining an example of input/output signals of an electronic control device included in a vehicle drive device of FIG. 1.

FIG. 4 exemplifies signals input to the electronic control device 50 and signals output from the electronic control device 50 and, specifically, an engine rotation speed sensor 70, an MG1 resolver (MG1 rotation speed sensor) 72, an MG2 resolver (MG2 rotation speed sensor) 74, an output rotation speed sensor 76, a foot brake sensor 78, an accelerator operation amount sensor 80, a steering angle sensor 82, and a vehicle acceleration sensor 83 are connected to the electronic control device 50 so as to supply signals indicative of the engine rotation speed Ne, the MG1 rotation speed Nmg1, the MG2 rotation speed Nmg2, the rotation speed (output rotation speed) Nout of the output shaft 32, the brake-pedal pressing operation force (brake operation force) Brk, an accelerator-pedal pressing operation amount (accelerator operation amount) Acc, the steering angle $\Phi$, and a vehicle acceleration G, respectively for example. The output rotation speed Nout corresponds to a vehicle speed V.

An auto cruise setting switch 84 is a device for performing a selection operation of a cruise running mode in which the constant speed running or the follow-up running is performed without driver's acceleration/deceleration operation, setting a target vehicle speed VtagC, increasing/decreasing the target vehicle speed VtagC, setting a target inter-vehicle distance DtagC during the follow-up running, etc., and is disposed on a steering wheel, for example, and signals indicative of the target vehicle speed VtagC, the target inter-vehicle distance DtagC, etc. are supplied to the electronic control device 50. A navigation system 86 stores map information to set a running route according to a destination, to display a map and the running route on a display device disposed on an instrument panel etc., and to acquire the position of the vehicle and various pieces of road traffic information of traffic jam, road gradients, altitude, legal speed limit, signal information, weather, etc., through GPS (Global Positioning System), VICS (registered trademark) (Vehicle Information and Communication System), vehicle-to-vehicle communication, road-to-vehicle communication, etc., and signals indicative of these pieces of information are supplied to the electronic control device 50. Operation members are disposed on the display device and in the vicinity thereof so that various selection operations, setting operations, etc. can be performed by touch operation, pressing operation, rotation operation, etc. Information communication equipment receiving information from the outside of the vehicle may be provided separately from the navigation system 86 as needed. A radar 88 detects an inter-vehicle distance to a preceding vehicle or a following vehicle and a distance to a pedestrian in the vicinity or an obstacle, and signals indicative of these pieces of information are supplied to the electronic control device 50. A camera 90 is a movie camera, a still camera, etc. photographing other vehicles, pedestrians, obstacles, traffic lights, traffic lanes, guardrails, parking positions, or predetermined indices, for example, which are present ahead of, behind, lateral to the vehicle, and a signal indicative of the image information is supplied to the electronic control device 50.

A manned automatic driving switch 92 is a switch for selecting an automatic driving running mode in which the drive force and the steering angle Φ of the vehicle are automatically controlled for running while a driver or an occupant is on board, and an unmanned automatic driving switch 94 is a switch for selecting an automatic driving running mode in which the drive force and the steering angle Φ of the vehicle are automatically controlled for running while a driver or an occupant is not on board. The unmanned automatic driving switch 94 is provided in a wireless key which wirelessly locks and unlocks a door of the vehicle, for example. In the automatic driving running modes described above, the target vehicle speed is sequentially automatically set based on, for example, map information, running route information, and various pieces of road traffic information to calculate the target drive force depending on the target vehicle speed, and the steering angle Φ is automatically controlled for running according to the running route; however, the automatic driving running modes may be performed for parking in a garage, parallel parking, etc. not requiring the map information and the running route information without driver's operation. Alternatively, the vehicle may automatically be called simply from a parking area etc. along a predetermined running route to a predetermined position such as an entrance of a house, and various forms are available. For the parking in a garage and the calling from a parking area, the unmanned automatic driving running mode is suitable. The unmanned automatic driving running mode is preferably adopted also in the case of platoon running (follow-up running) following a preceding leading vehicle, for example. The manned automatic driving switch 92 and the unmanned automatic driving switch 94 may be incorporated in the navigation system 86 such that selection between the manned automatic driving running mode and the unmanned automatic driving running mode can be made through the navigation system 86. A portion or all of the functions of the auto cruise setting switch 84 can also be incorporated in the navigation system 86.

An engine control signal is output from the electronic control device 50 to the engine output control device 40 (see FIG. 1) controlling the engine output so as to electrically control a throttle valve opening degree of the electronic throttle valve 100 of the engine 12, an amount of fuel supplied by the fuel injection device 102, the timing of ignition of the engine 12 by the ignition device 104, etc. The first motor generator MG1 and the second motor generator MG2 have motor torques individually electrically controlled by motor control signals output to the inverter 22. The shift control signal is output to the AT solenoid valves 106 etc. of the hydraulic control circuit 42 to provide the engagement/release control for each of the clutches C and the brakes B so that a predetermined gear position of the automatic transmission 16 is electrically established. The brake control signal is output to the automatic brake system 44 so that the braking force of the wheel brake 38 is electrically controlled. The steering angle control signal is output to the automatic steering system 46 so that the steering angle Φ is electrically controlled by the electric motor etc.

Figure 10:
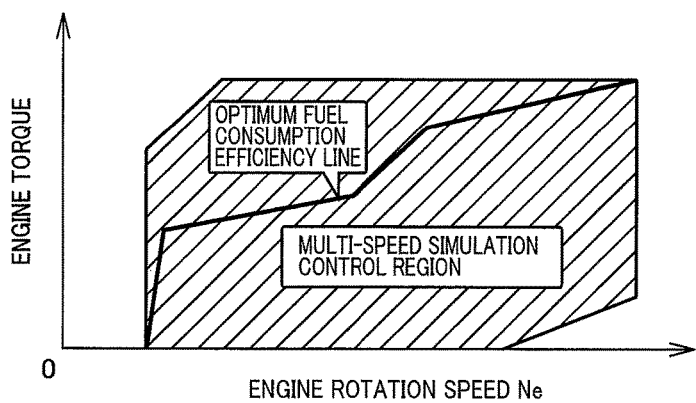
FIG. 10 is a diagram for explaining a control region of an engine when the simulated gear positions of FIG. 9 are established, also showing an optimum fuel consumption efficiency line.

As shown in FIG. 1, the electronic control device 50 functionally includes a hybrid control portion 52, a multi-speed transmission control portion 54, a steering control portion 56, a brake control portion 58, an automatic driving running mode control portion 60, a cruise running mode control portion 62, a driving operation running mode control portion 64, and uphill/downhill AI (artificial intelligence) control portion 66. The hybrid control portion 52 calculates a target engine output based on a transmission loss of each portion, an accessory load, the transmission ratio γ0 of the electric differential portion 14, an assist torque of the second motor generator MG2, the gear position (transmission ratio γ1) of the automatic transmission 16, etc., such that the vehicle is driven with a target drive force Ftag2 set by the automatic driving running mode control portion 60, and controls the engine 12 via the engine output control device 40 so as to achieve the engine rotation speed Ne and an engine torque Te at which the target engine output is acquired. The transmission ratio γ0 of the electric differential portion 14 is determined such that the engine 12 is operated in an efficient operation range, for example, on an optimum fuel consumption efficiency line shown in FIG. 10. In the case of the unmanned or manned automatic driving running mode, the target drive force Ftag2 is sequentially set based on various pieces of road traffic information such as legal speed limit and road gradient etc. by a target vehicle speed calculating portion 112, an F/F (feedforward) control calculating portion 132, an F/B (feedback) control calculating portion 134, a drive force adjustment portion 138, etc., of FIG. 6 for explaining the function of the automatic driving running mode control portion 60 such that the vehicle runs according to a predetermined running route. The target drive force Ftag2 is sequentially set such that the vehicle runs at the preset target vehicle speed VtagC during the constant speed running in the cruise running mode and performs the follow-up running at the predetermined target inter-vehicle distance DtagC during the follow-up running in the cruise running mode. During the driving operation running mode in which the drive force is controlled according to the driver's acceleration/deceleration operation (accelerator operation or brake operation), a target drive force FtagM is sequentially calculated from the accelerator operation amount Acc, the vehicle speed V, etc., and the target drive force Ftag 2 is set based on the target drive force FtagM. The target vehicle speed VtagC and the target inter-vehicle distance DtagC are set by the cruise running mode control portion 62 based on the signal from the auto cruise setting switch 84, and the target drive force FtagM is sequentially calculated by the driving operation running mode control portion 64 based on the accelerator operation amount Acc, the vehicle speed V, etc. The target inter-vehicle distance DtagC is selected from, for example, three levels of large, medium, and small each variably set according to the vehicle speed V, and the cruise running mode control portion 62 calculates a target drive force FtagC through feedback control etc. such that an actual inter-vehicle distance D to the preceding vehicle detected by the radar 88 becomes the target inter-vehicle distance DtagC, and the target drive force Ftag2 is set based on the target drive force FtagC. If the target drive force Ftag2 is negative (minus), a braking force by the power source is generated by an engine brake and a regenerative control of the second motor generator MG2 so that the target drive force Ftag2 is acquired in combination with the braking force of the wheel brakes 38 controlled by the brake control portion 58 and the braking force by the power source. The electronic control device 50 includes functions of the vehicle control device that make the vehicle to run in multiple running modes.

Figure 5:
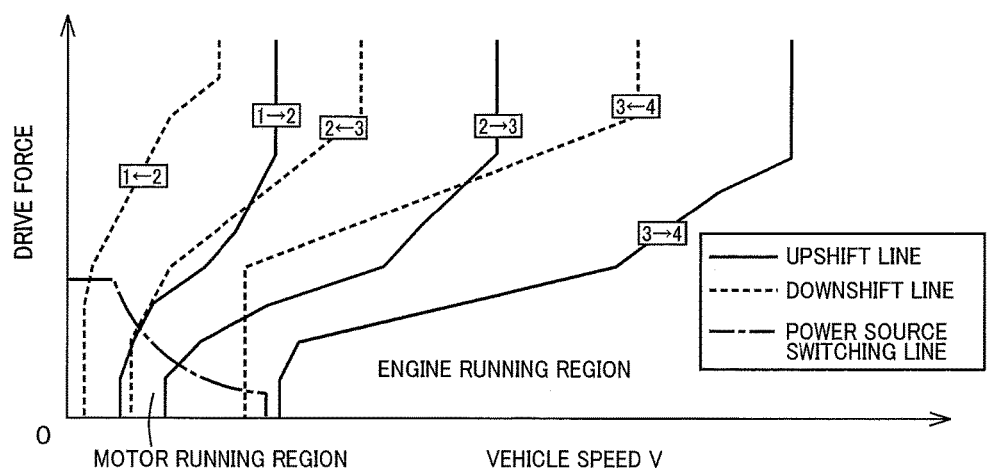
FIG. 5 is a diagram for explaining an example of a shift map used when a multi-speed transmission control portion of FIG. 1 provides a shift control of an automatic transmission, also showing a power source switching map.

The hybrid control portion 52 puts the engine 12 into a stop or idle state in a low output torque range or a low vehicle speed range considered as being relatively poor in engine efficiency and switches the power source according to a predetermined power source map so as to use only the second motor generator MG2 as the power source for running. A dashed-dotted line shown in the lower left portion (region of low drive force and low vehicle speed) of FIG. 5 is an example of a power source switching map defined based on the vehicle speed V and the drive force such that the region of low drive force and low vehicle speed is set as a motor running region, and the power source switching control is provided by starting or stopping the engine 12 etc. For the drive force, the actual drive force can be estimated from the engine torque, the motor torque, the gear position of the automatic transmission 16, etc.; however, the target drive force Ftag2 calculated by the automatic driving running mode control portion 60 is suitably used. Although not shown, a hysteresis is provided for preventing a busy shift between a switching line for switching from a motor running mode to an engine running mode and a switching line for switching from the engine running mode to the motor running mode. Even during the engine running mode using the engine 12 as the power source for running, the electric energy from the first motor generator MG1 under regenerative control and/or the electric energy from the electric storage device 24 are supplied to the second motor generator MG2, and the second motor generator MG2 is driven (subjected to power running control) to apply a torque to the drive wheels 36, thereby performing a torque assist for assisting the power of the engine 12. Therefore, the torque assist is performed by the second motor generator MG2 as needed even in an engine running region of FIG. 5.

The multi-speed transmission control portion 54 provides the shift control of the automatic transmission 16 according to a predetermined shift map and controls the engagement and release of the clutches C and the brakes B via the AT solenoid valves 106 of the hydraulic control circuit 42 so as to establish the target gear position obtained according to the shift map. The shift map represents a shift condition set based on the drive force and the vehicle speed V as shown in FIG. 5, for example, and is defined such that as the vehicle speed V becomes higher, the gear position is switched to the high speed side with the smaller transmission ratio γ1 and that as the drive force becomes higher, the gear position is switched to the low speed side with the larger transmission ratio γ1. For the drive force, for example, the target drive force Ftag2 calculated by the automatic driving running mode control portion 60 is used. FIG. 5 includes solid lines as upshift lines and broken lines as downshift lines, and a predetermined hysteresis is provided therebetween.

Figure 6:
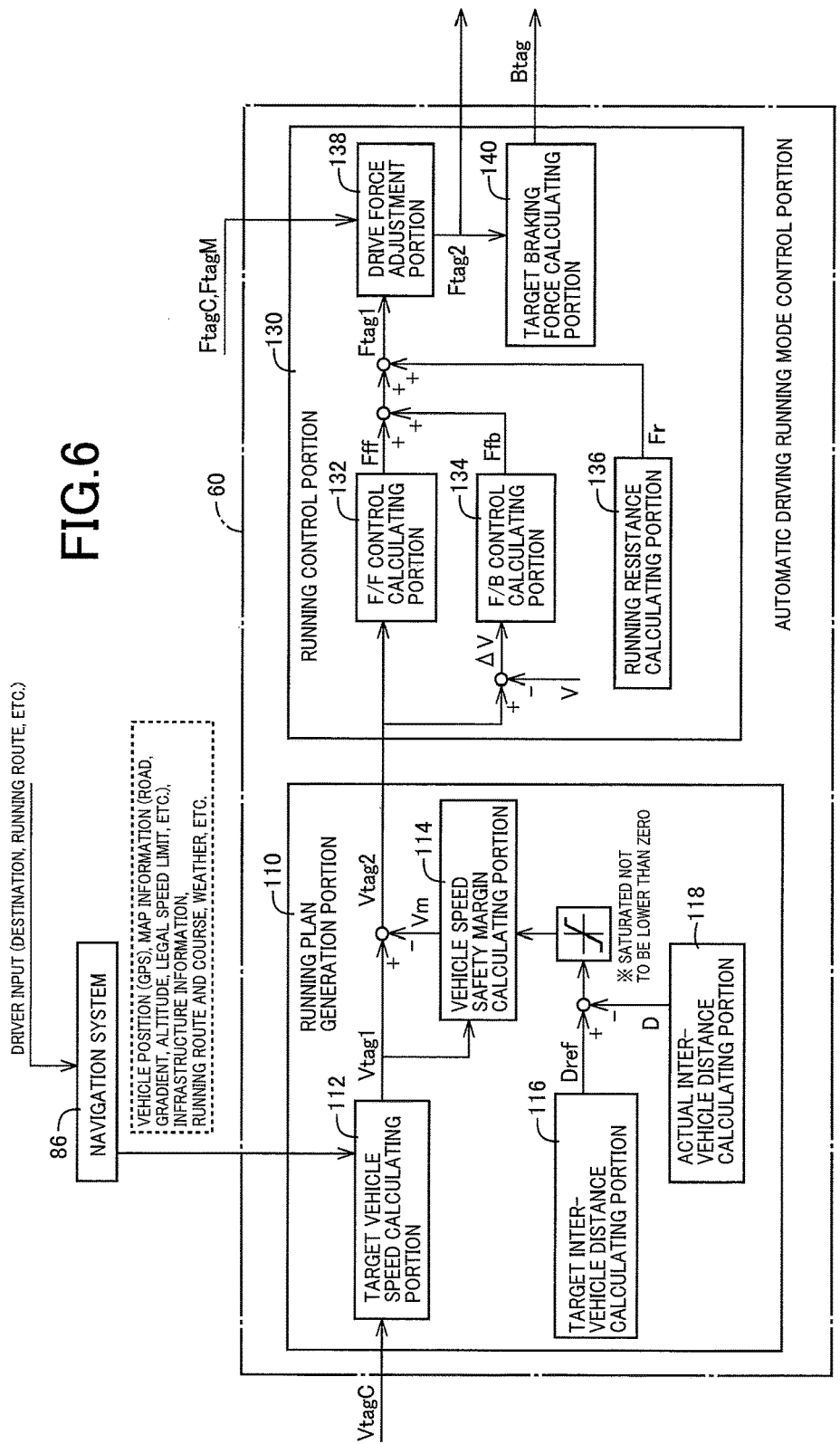
FIG. 6 is a block diagram for specifically explaining a function related to a drive system implemented by an automatic driving running mode control portion of FIG. 1.

The steering control portion 56 controls the automatic steering system 46 to achieve a target steering angle Φtag set by the automatic driving running mode control portion 60 when the manned or unmanned automatic driving running mode is selected. This target steering angle Φtag is determined based on road information etc. and is appropriately set depending on the vehicle speed V, the drive force, etc. for running according to a predetermined running route, for running along a traffic lane etc. detected by the camera 90 or switching the traffic lane, for performing parking in a garage or parallel parking based on parking position information detected by the camera 90, or for avoiding contact with a pedestrian or an obstacle detected by the radar 88 and the camera 90, for example. FIG. 6 is a diagram for explaining the function of the drive system of the automatic driving running mode control portion 60, and the steering control is not shown. The automatic driving running mode with the steering control portion 56 controlling the automatic steering system 46 to achieve the target steering angle Φtag is an automatic steering running mode, and the cruise running mode without automatic control of the steering angle Φ by the steering control portion 56 is a manual steering running mode.

When the manned or unmanned automatic driving running mode is selected, the brake control portion 58 controls the automatic brake system 44 such that the wheel brakes 38 are operated with a target braking force Btag set by the automatic driving running mode control portion 60. This target braking force Btag is appropriately set to decelerate at a predetermined deceleration with a target inter-vehicle distance calculating portion 116, an actual inter-vehicle distance calculating portion 118, a vehicle speed safety margin calculating portion 114, a target braking force calculating portion 140, etc. shown in FIG. 6 for stopping at a predetermined stop position, for stopping according to signal information (red signal) detected by the camera 90 or input from the outside, for ensuring an inter-vehicle distance to the preceding vehicle detected by the radar 88, or for avoiding contact with a pedestrian or an obstacle detected by the radar 88 and the camera 90. Not only in the automatic driving running mode but also in the cruise running mode in which the constant speed running or the follow-up running is performed as well as the driving operation running mode in which the drive force is controlled according to the driver's acceleration/deceleration operation, the target braking force Btag can be set under the certain conditions such as collision avoidance so as to forcibly operate the wheel brakes 38.

The automatic driving running mode control portion 60 functionally includes a running plan generation portion 110 and a running control portion 130 as shown in FIG. 6 with respect to the drive system. The running plan generation portion 110 includes the target vehicle speed calculating portion 112, the vehicle speed safety margin calculating portion 114, the target inter-vehicle distance calculating portion 116, and the actual inter-vehicle distance calculating portion 118, and the target vehicle speed calculating portion 112 is supplied with vehicle position information, map information of roads, gradients, altitude, legal speed limit, etc., infrastructure information, and information of running route and course, weather, etc. from the navigation system 86. In the navigation system 86, a destination, a running route, etc., are set by a driver, and setting can also be made in terms of cooperative driving achieved by adding a driver's operation to the automatic driving, time priority, fuel economy priority, an upper limit vehicle speed, a desired vehicle speed, etc. The infrastructure information is information on roads, signals, etc. supplied from information communication equipment disposed on roads, traffic lights, etc. Based on these pieces of information, the target vehicle speed calculating portion 112 sequentially sets a target vehicle speed Vtag1 serving as a base value when the automatic driving is performed. This target vehicle speed calculating portion 112 is supplied with information of the target vehicle speed VtagC during the constant speed running from the cruise running mode control portion 62 and sets the target vehicle speed VtagC as the target vehicle speed Vtag1 in the cruise running mode.

The vehicle speed safety margin calculating portion 114 calculates a vehicle speed safety margin Vm depending on a difference between a target inter-vehicle distance Dref determined by the target inter-vehicle distance calculating portion 116 and the actual inter-vehicle distance D calculated by the actual inter-vehicle distance calculating portion 118 based on the signal etc. from the radar 88, and a target vehicle speed Vtag2 is calculated by subtracting the vehicle speed safety margin Vm from the target vehicle. speed Vtag1. The target inter-vehicle distance Dref and the actual inter-vehicle distance D are the inter-vehicle distances to the preceding vehicle, and the target inter-vehicle distance Dref is set to a sufficient distance for avoiding a collision with the preceding vehicle depending on the current vehicle speed V etc. If the actual inter-vehicle distance D is greater than the target inter-vehicle distance Dref, the vehicle speed safety margin Vm is saturated at a lower limit amount i.e. Vm=0 so as to prevent unnecessarily increasing the vehicle speed V. The vehicle speed safety margin Vm may be obtained based not only on the preceding vehicle but also on the distance to a pedestrian, an obstacle, or a lateral vehicle expected to move to the front side.

The running control portion 130 includes the F/F (feedforward) control calculating portion 132, the F/B (feedback) control calculating portion 134, a running resistance calculating portion 136, the drive force adjustment portion 138, and the target braking force calculating portion 140. The F/F control calculating portion 132 calculates an FF drive force value Fff required for running at the target vehicle speed Vtag2 according to a predetermined feedforward control equation etc., and the F/B control calculating portion 134 calculates an FB correction value Ffb based on a deviation ΔV between the target vehicle speed Vtag2 and the current vehicle speed V according to a predetermined feedback control equation etc. The running resistance calculating portion 136 calculates a running resistance Fr based on a road load (R/L) of the vehicle, the road gradient, the number of occupants, a payload, etc. and adds the FF drive force value Fff, the FB correction value Ffb, and the running resistance Fr to calculate a base target drive force Ftag1. The road load may be set in advance in the navigation system 86 etc., or can be downloaded through a communication line or calculated from an actual drive force F, the road gradient, the vehicle speed V, etc.

The drive force adjustment portion 138 adjusts the target drive force Ftag1 depending on a running mode to set the final target drive force Ftag2. This drive force adjustment portion 138 is supplied with information of the target drive force FtagC calculated to perform the follow-up running at the target inter-vehicle distance Dtag from the cruise running mode control portion 62 and is supplied with information of the target drive force FtagM calculated based on the accelerator operation amount Acc and the vehicle speed V etc. from the driving operation running mode control portion 64, and these target drive forces FtagC, FtagM are used as the base target drive force Ftag1 during the cruise running mode and the driving operation running mode. For example, it is desirable to prioritize fuel consumption efficiency over drivability in the unmanned automatic driving running mode, to prioritize ride quality over drivability in the manned automatic driving running mode, to ensure a certain level of drivability in the cruise running mode, and to prioritize drivability over fuel consumption efficiency in the driving operation running mode. Therefore, for example, regarding a change rate that is a maximum value of a rate of change in the target drive force Ftag1, the change rate is maximized or no limit is placed on the change rate in the driving operation running mode to set the target drive force Ftag2 from the target drive force Ftag1. In the cruise running mode, the target drive force Ftag1 is limited as to change with the change rate smaller than that in the driving operation running mode and then, the target drive force Ftag2 is set; in the manned automatic driving running mode, the target drive force Ftag1 is limited as to change with the change rate smaller than that in the cruise running mode and then, the target drive force Ftag2 is set; and in the unmanned automatic driving running mode, the target drive force Ftag1 is limited as to change with the change rate smaller than that in the manned automatic driving running mode and then, the target drive force Ftag2 is set.

Information of the target drive force Ftag2 is supplied to the target braking force calculating portion 140 and is output to the hybrid control portion 52 and the multi-speed transmission control portion 54. When the target drive force Ftag2 is negative (takes minus value), the target braking force calculating portion 140 calculates and transmits to the brake control portion 58 the target braking force Btag of the wheel brakes 38 such that the target drive force Ftag2 is acquired in combination with the braking force by the power source generated by the hybrid control portion 52 and the target braking force Btag. When the automatic brake system 44 is controlled according to this target braking force Btag, the wheel brakes 38 are operated at the target braking force Btag, and the target drive force Ftag 2 is acquired in combination with the braking force by the power source achieved under the control of the hybrid control portion 52 and the target braking force Btag.

Figure 7:
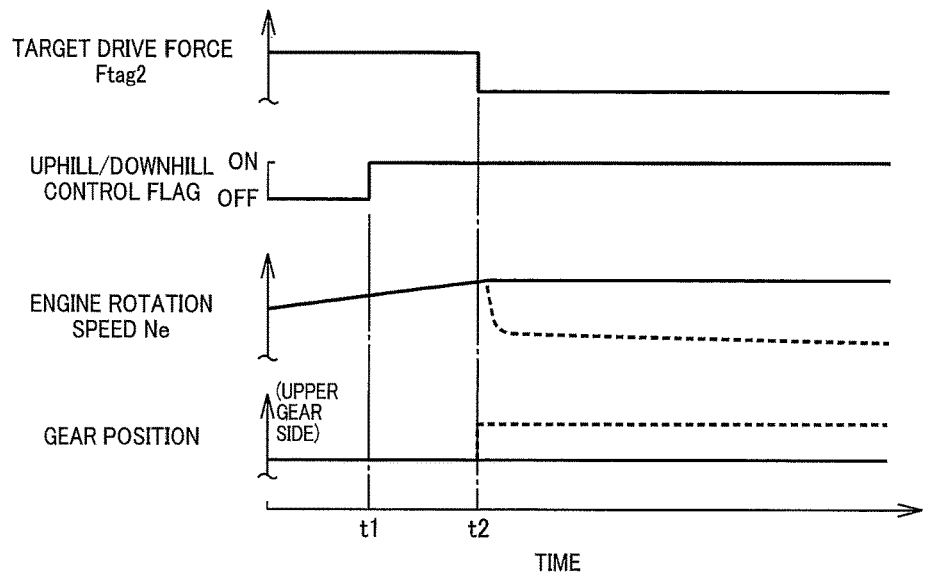
FIG. 7 is an exemplary time chart for explaining changes in operation state of portions when an uphill/downhill AI control is provided by an uphill/downhill AI control portion of FIG. 1.

Returning to FIG. 1, the uphill/downhill AI control portion 66 controls the automatic transmission 16 to keep the engine rotation speed Ne high during slope-road running on both the uphill road and the downhill road as compared to flat-road running. For example, even if the drive force decreases due to a curve on the uphill road etc., an upshift based on the shift map described in FIG. 5 is limited to maintain the engine rotation speed Ne at high rotation so as to improve drivability during reacceleration and, at the time of power-on on the uphill road, the shift map of FIG. 5 is shifted to the low drive force side or the high vehicle speed side to facilitate a downshift, or a downshift is forcibly performed to raise the engine rotation speed Ne so as to improve climbing performance. If the drive force decreases on the downhill road, an upshift based on the shift map of FIG. 5 is limited or a downshift is forcibly performed to raise the engine rotation speed Ne so as to increase the engine braking force. The engine rotation speed Ne can be raised not only by the shift control of the automatic transmission 16 but also by using the shift control of the electric differential portion 14 together. Solid lines of FIG. 7 are an example of a time chart in the case of keeping the engine rotation speed Ne high by the uphill/downhill AI control portion 66 when the drive force decreases due to the curve on the uphill road etc., and time t1 is a time when a uphill/downhill control flag is turned on due to a road gradient being a predetermined value or more. The road gradient can be calculated from the vehicle acceleration G, an engine torque, and a motor torque, for example, or may be detected by a gradient sensor etc. or may be read from map information or road information. If the target drive force Ftag2 decreases at time t2 and the shift control is provided according to the shift map of FIG. 5, as indicated by a broken line of FIG. 7, the automatic transmission 16 is upshifted and the engine rotation speed Ne is reduced; however, in this example, as indicated by the solid line, the upshift is prohibited, so that the engine rotation speed Ne is maintained at high rotation. This uphill/downhill AI control portion 66 corresponds to a slope-road running control portion.

Figure 8:
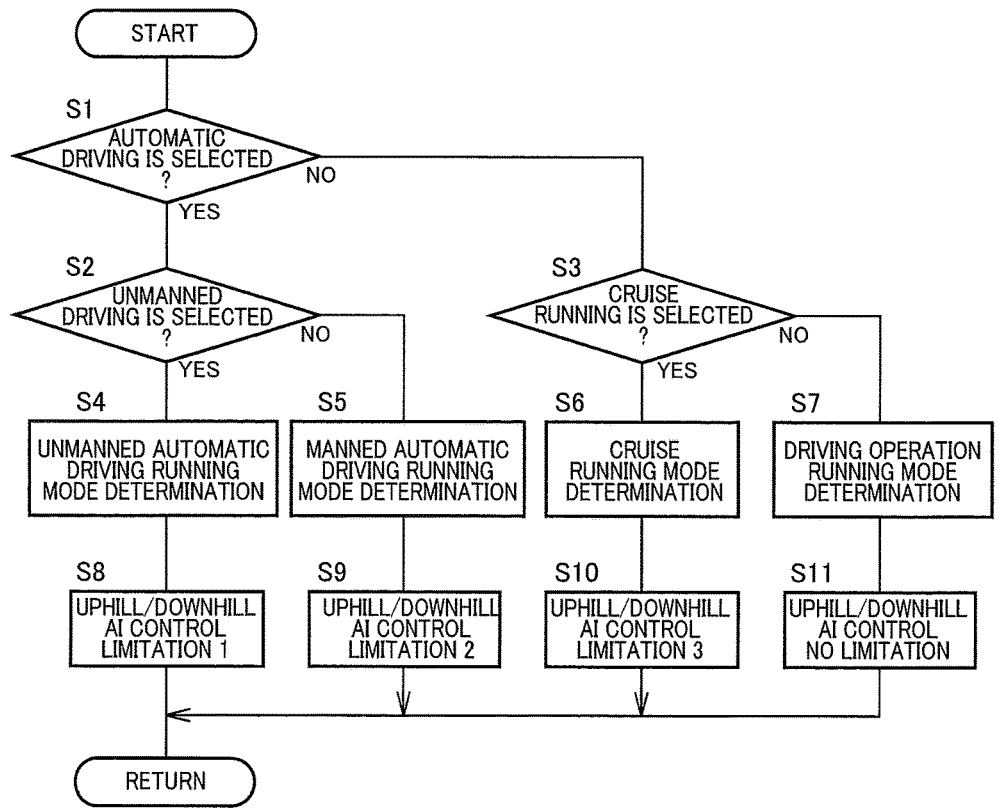
FIG. 8 is a flowchart for explaining an operation when the uphill/downhill AI control portion limits the uphill/downhill AI control for each running mode.

The uphill/downhill AI control portion 66 includes a limiting portion limiting the uphill/downhill AI control depending on a running mode and executes a signal process according to steps S1 to S11 (hereinafter simply referred to as S1 to S11) of a flowchart of FIG. 8. At S1 of FIG. 8, it is determined whether the automatic driving running mode is selected, based on whether the manned automatic driving switch 92 or the unmanned automatic driving switch 94 is turned on. When the automatic driving running mode is selected, S2 is executed to determine whether the unmanned automatic driving running mode is selected, based on whether the unmanned automatic driving switch 94 is turned on. If the unmanned automatic driving switch 94 is turned on, it is determined at S4 that the unmanned automatic driving running mode is selected and, if the unmanned automatic driving switch 94 is not turned on, it is determined at S5 that the manned automatic driving running mode is selected. If the determination at S1 is NO (negative), i.e., when the automatic driving running mode is not selected, S3 is executed to determine whether the cruise running mode is selected, based on whether the selection operation is performed with the auto cruise setting switch 84. If the selection operation is performed with the auto cruise setting switch 84, it is determined at S6 that the cruise running mode is selected and, if the selection operation is not performed with the auto cruise setting switch 84, it is determined at S7 that the selected mode is the normal running mode, i.e., the driving operation running mode in which the drive force control and the shift control are provided according to a driver's acceleration/deceleration operation while the steering angle Φ is changed according to a steering operation. All of the unmanned automatic driving running mode, the manned automatic driving running mode, and the cruise running mode are the second running mode in which the drive force control and the shift control are provided by setting the target driving state (the target vehicle speed, the target inter-vehicle distance, the target drive force, the target steering angle, etc.) without the acceleration/deceleration operation, and the driving operation running mode is the first running mode in which the drive force control and the shift control are provided according to the acceleration/deceleration operation.

If it is determined at S4 that the unmanned automatic driving running mode is selected, a limitation 1 is set at S8; if it is determined at S5 that the manned automatic driving running mode is selected, a limitation 2 is set at S9; if it is determined at S6 that the cruise running mode is selected, a limitation 3 is set at S10; and if it is determined at S7 that the driving operation running mode is selected, no limitation is set at S11. The limitations 1 to 3 set at S8 to S10 respectively have differences in increase amount of the engine rotation speed Ne compared with during flat-road running, and the increase amount is set such that the relationship of increase amount in limitation 1<increase amount in limitation 2<increase amount in limitation 3 is satisfied. In particular, if the increase amount of the engine rotation speed Ne is made larger by limiting the upshift or performing the downshift, the acceleration performance and the reacceleration performance on the uphill road are improved, or a large engine braking force can be acquired on the downhill road; however, since the fuel consumption efficiency is deteriorated due to the rise in the engine rotation speed Ne, the increase amount is limited depending on a running mode so as to achieve a balance between fuel consumption efficiency and drivability. Specifically, when a degree of demand (degree of driver's expectation) for acceleration/deceleration on the uphill/downhill road is smaller, the increase amount of the engine rotation speed Ne is made smaller to improve fuel consumption efficiency and, on the other hand, when the degree of demand for acceleration/deceleration on the uphill/downhill road is larger, the increase amount of the engine rotation speed Ne is made larger so that adequate drivability is acquired. The increase amount of the engine rotation speed Ne can be changed by the number of upshifts or downshifts to be limited in the automatic transmission 16, and the engine rotation speed Ne can be controlled in more detail by the continuously variable shift control of the electric differential portion 14.

In the unmanned automatic driving running mode, since any occupant is absent and it is not necessary to consider the degree of demand for acceleration/deceleration as compared to manned running, the increase amount of the engine rotation speed Ne can be reduced to improve the fuel consumption efficiency. The increase amount of the engine rotation speed Ne may be set to zero, i.e., the uphill/downhill AI control may be cancelled. In the manned automatic driving running mode in which any occupant is present, since the degree of demand for acceleration/deceleration is larger than the unmanned automatic driving running mode, the engine rotation speed Ne is desirably increased to ensure the acceleration/deceleration performance. However, since the degree of demand for acceleration/deceleration is lower as compared to the cruise running mode and the driving operation running mode, the limitation 2 is set to make the increase amount of the engine rotation speed Ne smaller than these running modes. In the cruise running mode, since the vehicle runs at the target vehicle speed Vtag or follows the preceding vehicle at the target inter-vehicle distance Dtag, the degree of demand for acceleration/deceleration is higher than the automatic driving running mode, so that the limitation 3 is set to make the increase amount of the engine rotation speed Ne larger than the manned automatic driving running mode. However, since the degree of demand for acceleration/deceleration is lower as compared to the driving operation running mode in which the driver performs the acceleration/deceleration operation in real time, the increase amount of the engine rotation speed Ne can be made smaller than the driving operation running mode. In the driving operation running mode, since the driver makes an acceleration/deceleration demand by himself/herself, excellent drivability for acceleration/deceleration is required even on the uphill/downhill road, and the uphill/downhill AI control is desirably provided without limitation.

The degree of demand for acceleration/deceleration (degree of driver's expectation) on the uphill/downhill road corresponds to a degree of participation of driver's driving operation, and it is generally considered that when the degree of participation of driving operation is smaller, the degree of demand for acceleration/deceleration is smaller. For example, in the unmanned automatic driving running mode and the manned automatic driving running mode in which the steering angle Φ is automatically controlled, the degree of demand for drivability is considered to be lower as compared to the cruise running mode in which the driver controls the steering angle Φ and, also from this point, it is desirable to make the increase amount of the engine rotation speed Ne smaller during the unmanned automatic driving running mode and the manned automatic driving running mode as compared to the cruise running mode to improve the fuel consumption efficiency.

In the running modes described above, the increase amount of the engine rotation speed Ne during running on the uphill/downhill road is respectively uniformly determined; however, for example, in the case of the follow-up running of the cruise running mode, acceleration/deceleration can be predicted based on the inter-vehicle distance D and the vehicle speed V so as to make the increase amount of the engine rotation speed Ne larger when the possibility of acceleration/deceleration is high. In particular, when the inter-vehicle distance D is short or the vehicle speed V is high, it can be predicted that sudden acceleration/deceleration is highly likely to be required, so that the increase amount of the engine rotation speed Ne is made larger. Also in the other running modes, the increase amount of the engine rotation speed Ne during running on the uphill/downhill road can be changed based on the inter-vehicle distance D, the vehicle speed V, etc.

Figure 9:
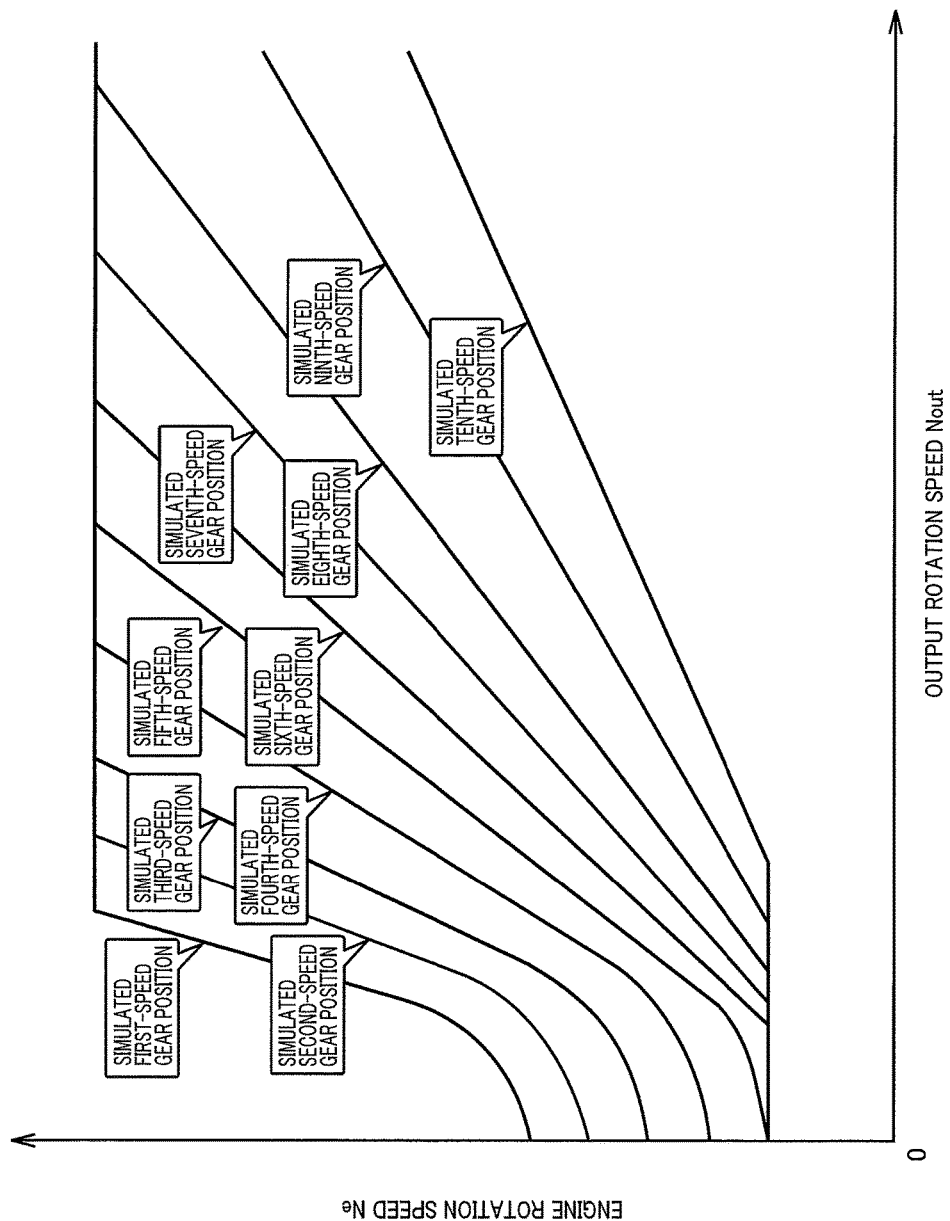
FIG. 9 is a diagram for explaining a plurality of simulated (overall) gear positions established by a multi-speed simulation control portion functionally included in a hybrid control portion of FIG. 1.

Returning to FIG. 1, the hybrid control portion 52 functionally includes a multi-speed simulation control portion 68. The multi-speed simulation control portion 68 controls the electric differential portion 14 so as to execute a multi-speed simulation control i.e., so as to establish a plurality of simulated gear positions different in transmission ratio γ2 of the engine rotation speed Ne to the output rotation speed Nout (i.e., γ2=Ne/Nout), and the transmission ratio γ2 is a value obtained by multiplying the transmission ratio γ0 of the electric differential portion 14 by the transmission ratio γ1 of the automatic transmission 16 (i.e., γ2=γ0*γ1). For example, as shown in FIG. 9, the plurality of simulated gear positions can be established by controlling the engine rotation speed Ne by the first motor generator MG 1 according to the output rotation speed Nout such that the transmission ratio γ2 of each gear position can be maintained. FIG. 9 shows the case that a ten-speed transmission can be achieved with the plurality of simulated gear positions from a simulated first-speed gear position to a simulated tenth-speed gear position, and a driving feeling such as drivability and engine sound similar to that when a mechanical multi-speed transmission is used can be acquired as a whole. In this case, the engine 12 has the engine torque and the engine rotation speed Ne changed in a range of a multi-speed simulation control region indicated by hatching in FIG. 10.

Figure 11:
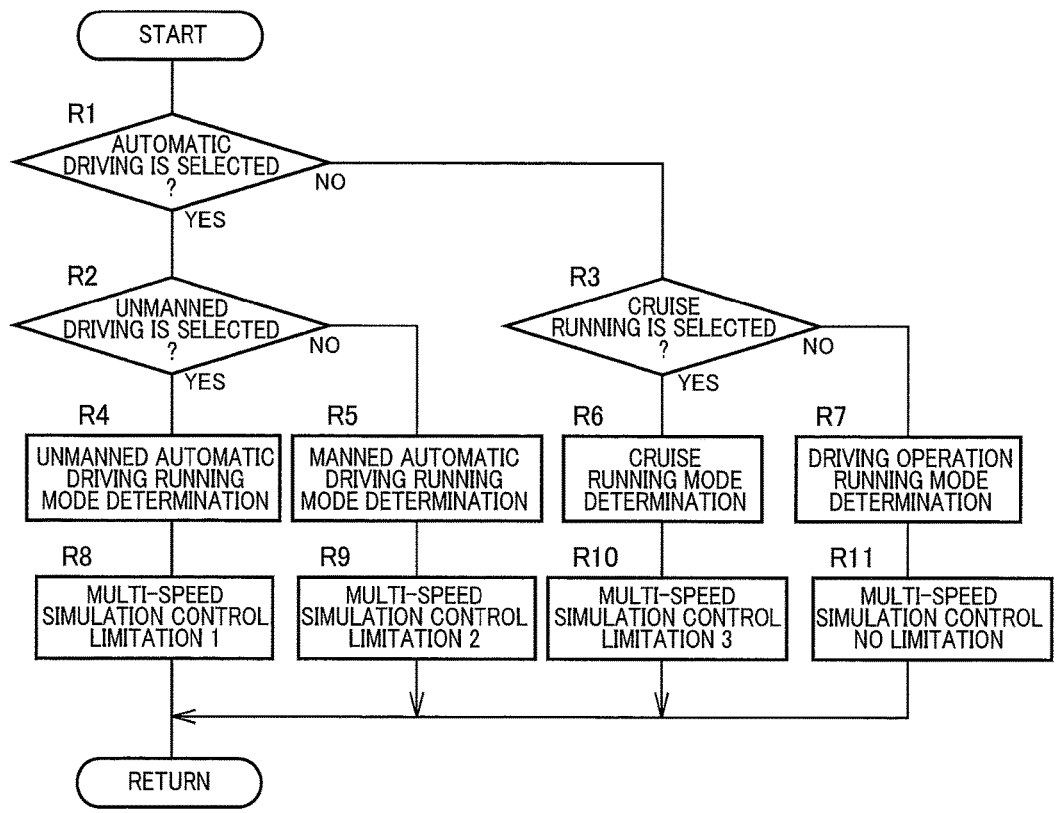
FIG. 11 is a flowchart for explaining an operation when the multi-speed simulation control portion limits a multi-speed simulation control for each running mode.

The multi-speed simulation control portion 68 includes a limiting portion limiting the multi-speed simulation control depending on a running mode and executes a signal process according to steps R1 to R11 (hereinafter simply referred to as R1 to R11) of a flowchart of FIG. 11. At R1 to R7 of FIG. 11, the running mode is determined in the same way as S1 to S7 of FIG. 8 described above. The determination results of S4 to S7 may be read. If it is determined at R4 that the unmanned automatic driving running mode is selected, a limitation 1 is set at R8; if it is determined at R5 that the manned automatic driving running mode is selected, a limitation 2 is set at R9; if it is determined at R6 that the cruise running mode is selected, a limitation 3 is set at R10; and if it is determined at R7 that the driving operation running mode is selected, no limitation is set at R11. The limitations 1 to 3 set at R8 to R10 respectively have differences in control region (hatched portion of FIG. 10) in which the engine 12 is operated when simulated gear positions are used, and the range of the control region is set such that the relationship of control region in limitation 1<control region in limitation 2<control region in limitation 3 is satisfied. In particular, if the control region of the engine 12 is made larger in the simulated gear positions, the engine rotation speed Ne is greatly changed at the time of shifting, so that the driving feeling (such as drivability and engine sound) similar to that when a multi-speed transmission is used can be acquired; however, since fuel consumption efficiency is deteriorated due to deviation of an engine operating point from the optimum fuel consumption efficiency line, the control region is limited depending on a running mode so as to achieve a balance between fuel consumption efficiency and drivability. Specifically, when a degree of demand for acceleration/deceleration (degree of driver's expectation) is smaller, the control region of the engine 12 is made smaller to improve fuel consumption efficiency and, on the other hand, when the degree of demand for acceleration/deceleration is larger, the control region of the engine 12 is made larger so that adequate drivability is acquired.

In the unmanned automatic driving running mode, since any occupant is absent and it is not necessary to consider the degree of demand for acceleration/deceleration as compared to manned running, the control region of the engine 12 can be reduced to improve the fuel consumption efficiency. The multi-speed simulation control may be cancelled to allow the engine 12 to operate on the optimum fuel consumption efficiency line. In the manned automatic driving running mode in which the occupant is present, since the degree of demand for acceleration/deceleration is larger than the unmanned automatic driving running mode, the control region of the engine 12 is desirably increased to improve the driving feeling. However, since the degree of demand for acceleration/deceleration is lower as compared to the cruise running mode and the driving operation running mode, the limitation 2 is set to make the control region of the engine 12 smaller than these running modes. In the cruise running mode, since the vehicle runs at the target vehicle speed Vtag or follows the preceding vehicle at the target inter-vehicle distance Dtag, the degree of demand for acceleration/deceleration is higher than the automatic driving running mode, so that the limitation 3 is set to make the control region of the engine 12 larger than the manned automatic driving running mode. However, since the degree of demand for acceleration/deceleration is lower as compared to the driving operation running mode in which the driver performs the acceleration/deceleration operation in real time, the control region of the engine 12 may be smaller than the driving operation running mode. In the driving operation running mode, since the driver makes an acceleration/deceleration demand by himself/herself, it is desirable that excellent driving feeling is acquired, and the multi-speed simulation control is desirably provided without limitation.

The degree of demand for acceleration/deceleration (degree of driver's expectation) corresponds to a degree of participation of driver's driving operation, and it is generally considered that when the degree of participation of driving operation is smaller, the degree of demand for acceleration/deceleration is smaller. For example, in the unmanned automatic driving running mode and the manned automatic driving running mode in which the steering angle Φ is automatically controlled, the degree of demand for acceleration/deceleration is considered to be lower as compared to the cruise running mode in which the driver controls the steering angle Φ and, also from this point, it is desirable to make the control region of the engine 12 smaller to improve the fuel consumption efficiency during the unmanned automatic driving running mode and the manned automatic driving running mode as compared to the cruise running mode.

As described above, the electronic control device 50 of the vehicle drive device 10 of this example includes the uphill/downhill AI control portion 66 controlling the automatic transmission 16 to keep the engine rotation speed Ne high during slope-road running as compared to flat-road running and excellent drivability is acquired during slope-road running, while the increase amount of the engine rotation speed Ne during the uphill/downhill AI control is limited in the second running mode (the unmanned and manned automatic driving running modes and the cruise running mode) as compared to the first running mode (the driving operation running mode), so that the fuel consumption efficiency is improved. In the second running mode, since the driver does not perform the acceleration/deceleration operation, the driver's demand for drivability is limited, so that the driver is less likely to feel strange even if the drivability is somewhat poor due to the limitation of the increase amount of the engine rotation speed Ne. Particularly, in the automatic driving running mode in which the target running state is set based on road information to automatically perform acceleration/deceleration, it is considered that prioritizing smooth ride quality and fuel consumption efficiency over drivability matches the occupant's intention.

The follow-up running mode (cruise running mode) and the unmanned or manned automatic driving running mode are included as the second running mode, and the increase amount of the engine rotation speed Ne under the uphill/downhill AI control is made smaller during the automatic driving running mode as compared to the follow-up running mode and, therefore, the fuel consumption efficiency can further be improved by making the increase amount of the engine rotation speed Ne smaller during the automatic driving running mode while ensuring the drivability during the follow-up running mode. In particular, since the vehicle follows the preceding vehicle in the follow-up running mode, it is considered that the degree of driver's demand for acceleration/deceleration is higher as compared to the automatic driving running mode, so that the increase amount of the engine rotation speed Ne is made larger as compared to the automatic driving running mode to ensure the drivability during slope-road running.

The automatic steering running mode (unmanned and manned automatic driving running modes) and the manual steering running mode (cruise running mode) are included as the second running mode, and the increase amount of the engine rotation speed Ne under the uphill/downhill AI control is made smaller during the automatic steering running mode as compared to the manual steering running mode and, therefore, the fuel consumption efficiency can further be improved by making the increase amount of the engine rotation speed Ne smaller during the automatic steering running mode while ensuring the drivability during the manual steering running mode. In particular, a degree of participation of driver's driving operation is larger in the manual steering running mode since the driver controls the steering angle Φ, and it is considered that the degree of driver's demand for drivability is higher as compared to the automatic steering running mode. Thus, the increase amount of the engine rotation speed Ne is made larger as compared to the automatic steering running mode to ensure the drivability during slope-road running.

This example includes the multi-speed simulation control portion 68 controlling the electric differential portion 14 so as to establish a plurality of simulated gear positions different in the transmission ratio γ2 of the engine rotation speed Ne to the output rotation speed Nout, and the driving feeling (such as drivability and engine sound) similar to a multi-speed transmission can be acquired by changing the engine rotation speed Ne at the time of acceleration/deceleration associated with a shift of the simulated gear positions, while the control region of the engine rotation speed Ne during the multi-speed simulation control is limited in the second running mode (the unmanned and manned automatic driving running modes and the cruise running mode) as compared to the first running mode (the driving operation running mode), so that the fuel consumption efficiency is improved. In the second running mode, since the driver does not perform the acceleration/deceleration operation, the driver's demand for the driving feeling including drivability is limited, so that the driver is less likely to feel strange even if the driving feeling is somewhat poor due to the limitation of the control region of the engine rotation speed Ne. Particularly, in the automatic driving running mode in which the target running state is set based on road information to automatically perform acceleration/deceleration, it is considered that prioritizing smooth ride quality and fuel consumption efficiency over driving feeling matches the occupant's intention.

The follow-up running mode (cruise running mode) and the unmanned or manned automatic driving running mode are included as the second running mode, and the control region of the engine rotation speed Ne during the multi-speed simulation control is made narrower during the automatic driving running mode as compared to the follow-up running mode and, therefore, the fuel consumption efficiency can further be improved by making the control region of the engine rotation speed Ne smaller during the automatic driving running mode while ensuring the driving feeling during the follow-up running mode. In particular, since the vehicle follows the preceding vehicle in the follow-up running mode, it is considered that the degree of driver's demand for acceleration/deceleration is higher as compared to the automatic driving running mode, so that the control region of the engine rotation speed Ne is made larger as compared to the automatic driving running mode to acquire the excellent driving feeling including drivability.

The automatic steering running mode (unmanned and manned automatic driving running modes) and the manual steering running mode (cruise running mode) are included as the second running mode, and the control region of the engine rotation speed Ne during the multi-speed simulation control is made narrower during the automatic steering running mode as compared to the manual steering running mode and, therefore, the fuel consumption efficiency can further be improved by making the control region of the engine rotation speed Ne narrower during the automatic steering running mode while ensuring the driving feeling during the manual steering running mode. In particular, a degree of participation of driver's driving operation is larger in the manual steering running mode since the driver controls the steering angle Φ, and it is considered that the degree of driver's demand for drivability is higher as compared to the automatic steering running mode. Thus, the control region of the engine rotation speed Ne is made larger as compared to the automatic steering running mode to acquire the excellent driving feeling including drivability.

Although the uphill/downhill AI control portion 66 of the example limits the upshift of the automatic transmission 16 or forcibly performs the downshift so as to keep the engine rotation speed Ne high during slope-road running as compared to flat-road running, the engine rotation speed Ne can be increased by controlling the rotation speed Nmg1 of the first motor generator MG1 in the electric differential portion 14 functioning as the electric continuously variable transmission. For example, during the motor running mode in which the second motor generator MG2 is used as the power source for running, while the engine rotation speed Ne is maintained at substantially zero in flat-road running, the engine rotation speed Ne can be raised in preparation for an acceleration demand in running on an uphill road. The engine 12 may be started and allowed to rotate by itself, or may simply be cranked. In this case, in the second running mode such as the cruise running mode and the unmanned or manned automatic driving running mode, the increase amount of the engine rotation speed Ne may be reduced or the rotation stopped state may be maintained. The electric differential portion 14 corresponds to an automatic transmission.

Figures 12, 13:
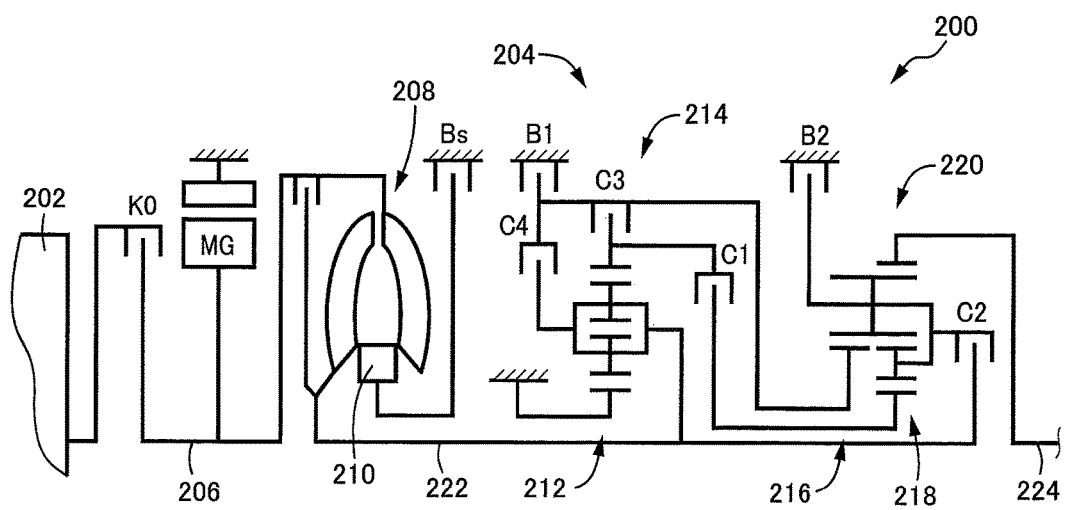
FIG. 12 is a schematic for explaining another vehicle drive device for a hybrid vehicle to which the present invention is preferably applied.
FIG. 13 is an engagement operation table for explaining a plurality of gear positions of an automatic transmission of FIG. 12 and friction engagement devices for establishing the gear positions.

Although the vehicle drive device 10 having the electric differential portion 14 and the automatic transmission 16 capable of shifting among four forward speeds has been described in the example, the present invention is applicable to a vehicle drive device 200 shown in FIG. 12, for example, and is also applicable to various vehicle control devices. The vehicle drive device 200 of FIG. 12 relates to a hybrid vehicle including an engine 202 and a motor generator MG as a power source and having an automatic transmission 204 capable of shifting among eight forward speeds. The engine 202 is connected through a connecting/disconnecting clutch K0 to a motor shaft 206 of the motor generator MG and the outputs of the engine 202 and the motor generator MG are transmitted from the motor shaft 206 through a torque converter 208 to an input shaft 222 of the automatic transmission 204. A stator (guide impeller) 210 of the torque converter 208 is arranged such that rotation of the stator 210 is selectively stopped by a stator brake Bs.

The automatic transmission 204 includes on a common axis a first transmission portion 214 mainly made up of a double pinion type first planetary gear device 212, and a second transmission portion 220 mainly made up of a single pinion type second planetary gear device 216 and a double pinion type third planetary gear device 218, and changes a speed of rotation of the input shaft 222 before output from an output shaft 224 to rotationally drive left and right drive wheels through a final reduction gear etc. not shown. The second planetary gear device 216 and the third planetary gear device 218 have carriers and ring gears of both devices made up of members common to each other and form a Ravigneaux type planetary gear train in which a pinion gear of the second planetary gear device 216 also serves as a second pinion gear (outer pinion gear) of the third planetary gear device 218. This automatic transmission 204 has four clutches C1 to C4 and two brakes B1 and B2 (hereinafter simply referred to as clutches C and brakes B if not particularly distinguished) provided as hydraulic friction engagement devices and, as shown in an engagement operation table of FIG. 13, any two of the clutches C and the brakes B are engaged to establish forward gear positions 1st to 8th for eight forward speeds and backward gear positions Rev1, Rev2 for two backward speeds, and all of the clutches C and the brakes B are released to establish N (neutral) at which power transmission is interrupted.

Also with the vehicle drive device 200 as described above, the vehicle can run in the driving operation running mode, the cruise running mode, the manned automatic driving running mode, and the unmanned automatic driving running mode respectively due to the engine output control device 40, the hydraulic control circuit 42, the automatic brake system 44, the automatic steering system 46, and the electronic control device 50, etc. in the vehicle drive device 200 and the same effects as the example can be acquired when the uphill/downhill AI control portion 66 provides the uphill/downhill AI control for each of the running modes.

Although the examples of the present invention have been described in detail with reference to the drawings, these are merely an embodiment and the present invention can be implemented in variously modified and improved forms based on the knowledge of those skilled in the art.

REFERENCE SIGNS LIST 12, 202: Engine 14: Electric differential portion (Automatic transmission) 16, 204: Automatic transmission 50: Electronic control device (Vehicle control device) 66: Uphill/downhill AI control portion (Slope-road running control portion) MG1: First motor generator (Electric generator) MG2: Second motor generator (Electric motor) Ne: Engine rotation speed Φ: Steering angle

What is claimed is:

1. A vehicle control device for a vehicle including an engine used as a power source and an automatic transmission,
    the vehicle control device performing a first running mode in which a shift control of the automatic transmission and a drive force control are provided according to a driver's acceleration/deceleration operation and a second running mode in which the shift control and the drive force control are provided without the acceleration/deceleration operation while a target running state is set, comprising:
    a slope-road running control portion configured to control the automatic transmission such that an engine rotation speed is kept high during slope-road running on at least one of an uphill road and a downhill road as compared to flat-road running,
    the slope-road running control portion limiting an increase amount of the engine rotation speed in the second running mode as compared to the first running mode.

2. A vehicle control device for a vehicle including an engine used as a power source and an automatic transmission, the vehicle being a hybrid vehicle further including an electric motor as the power source, the vehicle control device performing a motor running mode performed by using the electric motor while the engine is stopped and an engine running mode performed by using the power of the engine, the vehicle control device performing a first running mode in which a shift control of the automatic transmission and a drive force control are provided according to a driver's acceleration/deceleration operation and a second running mode in which the shift control and the drive force control are provided without the acceleration/deceleration operation while a target running state is set, comprising:

a slope-road running control portion configured to control the automatic transmission such that an engine rotation speed is kept high during slope-road running on at least one of an uphill road and a downhill road as compared to flat-road running, the slope-road running control portion limiting an increase amount of the engine rotation speed in the second running mode as compared to the first running mode.

3. The vehicle control device according to claim 2, wherein the slope-road running control portion operates the engine and controls the automatic transmission such that the engine rotation speed is kept high during the slope-road running as compared to the flat-road running in the first running mode, and stops the engine in the second running mode.

4. A vehicle control device for a hybrid vehicle including an engine, an electric generator rotationally driven by the engine, and an electric motor for running generating power from electric energy generated by the electric generator, the vehicle control device performing a first running mode in which a drive force control is provided according to a driver's acceleration/deceleration operation and a second running mode in which the drive force control is provided without the acceleration/deceleration operation while a target running state is set, comprising:

a slope-road running control portion configured to keep an engine rotation speed high during slope-road running on at least one of an uphill road and a downhill road as compared to flat-road running, the slope-road running control portion limiting an increase amount of the engine rotation speed in the second running mode as compared to the first running mode.

5. The vehicle control device according to claim 4, wherein the hybrid vehicle is a series-hybrid vehicle in which the engine is used exclusively for electric generation.

6. The vehicle control device according to claim 4, wherein the slope-road running control portion keeps the engine rotation speed high during climbing the uphill road as compared to flat-road running and makes an electric power generated by the electric generator smaller during climbing the uphill road in the second running mode as compared to climbing the uphill road in the first running mode.

7. The vehicle control device according to claim 4, wherein the slope-road running control portion operates the engine and keeps the engine rotation speed high during the slope-road running as compared to the flat-road running in the first running mode, and stops the engine in the second running mode.

8. The vehicle control device according to claim 1, wherein the second running mode includes a follow-up running mode in which a target drive force is calculated to enable follow-up running for a preceding vehicle and the target drive force is used as the target running state.

9. The vehicle control device according to claim 2, wherein the second running mode includes a follow-up running mode in which a target drive force is calculated to enable follow-up running for a preceding vehicle and the target drive force is used as the target running state.

10. The vehicle control device according to claim 4, wherein the second running mode includes a follow-up running mode in which a target drive force is calculated to enable follow-up running for a preceding vehicle and the target drive force is used as the target running state.

11. The vehicle control device according to claim 1, wherein the second running mode includes an automatic driving running mode in which the target running state is set based on road information for automatically performing acceleration/deceleration.

12. The vehicle control device according to claim 2, wherein the second running mode includes an automatic driving running mode in which the target running state is set based on road information for automatically performing acceleration/deceleration.

13. The vehicle control device according to claim 4, wherein the second running mode includes an automatic driving running mode in which the target running state is set based on road information for automatically performing acceleration/deceleration.

14. The vehicle control device according to claim 1, wherein the second running mode includes a plurality of running modes different in degree of driver's demand for the acceleration/deceleration, and wherein the slope-road running control portion makes the increase amount of the engine rotation speed smaller in the second running mode in which the degree of demand for the acceleration/deceleration is small, as compared to the second running mode in which the degree of demand for the acceleration/deceleration is large.

15. The vehicle control device according to claim 2, wherein the second running mode includes a plurality of running modes different in degree of driver's demand for the acceleration/deceleration, and wherein the slope-road running control portion makes the increase amount of the engine rotation speed smaller in the second running mode in which the degree of demand for the acceleration/deceleration is small, as compared to the second running mode in which the degree of demand for the acceleration/deceleration is large.

16. The vehicle control device according to claim 4, wherein the second running mode includes a plurality of running modes different in degree of driver's demand for the acceleration/deceleration, and wherein the slope-road running control portion makes the increase amount of the engine rotation speed smaller in the second running mode in which the degree of demand for the acceleration/deceleration is small, as compared to the second running mode in which the degree of demand for the acceleration/deceleration is large.

17. The vehicle control device according to claim 1, wherein the second running mode includes a follow-up running mode in which a target drive force is calculated to enable follow-up running for a preceding vehicle and the target drive force is used as the target running state, and an automatic driving running mode in which the target running state is set based on road information for automatically performing acceleration/deceleration, and wherein the slope-road running control portion makes the increase amount of the engine rotation speed smaller in the automatic driving running mode as compared to the follow-up running mode.

18. The vehicle control device according to claim 2, wherein the second running mode includes a follow-up running mode in which a target drive force is calculated to enable follow-up running for a preceding vehicle and the target drive force is used as the target running state, and an automatic driving running mode in which the target running state is set based on road information for automatically performing acceleration/deceleration, and wherein the slope-road running control portion makes the increase amount of the engine rotation speed smaller in the automatic driving running mode as compared to the follow-up running mode.

19. The vehicle control device according to claim 4, wherein the second running mode includes a follow-up running mode in which a target drive force is calculated to enable follow-up running for a preceding vehicle and the target drive force is used as the target running state, and an automatic driving running mode in which the target running state is set based on road information for automatically performing acceleration/deceleration, and wherein the slope-road running control portion makes the increase amount of the engine rotation speed smaller in the automatic driving running mode as compared to the follow-up running mode.

20. The vehicle control device according to claim 1, wherein the second running mode includes an automatic steering running mode in which a steering angle is automatically controlled based on road information and a manual steering running mode in which the steering angle is operated by a driver, and wherein the slope-road running control portion makes the increase amount of the engine rotation speed smaller in the automatic steering running mode as compared to the manual steering running mode.

\* \* \* \* \*